United States Patent
Adar

(10) Patent No.: US 8,392,999 B2
(45) Date of Patent: Mar. 5, 2013

(54) APPARATUS AND METHODS FOR ASSESSING AND MAINTAINING SECURITY OF A COMPUTERIZED SYSTEM UNDER DEVELOPMENT

(75) Inventor: Eyal Adar, Bnei Brak (IL)

(73) Assignee: White Cyber Knight Ltd., Bnei Brak (IL)

( * ) Notice: Subject to any disclaimer, the term of this patent is extended or adjusted under 35 U.S.C. 154(b) by 291 days.

(21) Appl. No.: 12/785,620

(22) Filed: May 24, 2010

(65) Prior Publication Data

US 2010/0306852 A1 Dec. 2, 2010

Related U.S. Application Data

(63) Continuation-in-part of application No. 11/305,196, filed on Dec. 19, 2005, now abandoned.

(51) Int. Cl.
G06F 11/00 (2006.01)
(52) U.S. Cl. .......................................................... 726/25
(58) Field of Classification Search .................. None
See application file for complete search history.

(56) References Cited

U.S. PATENT DOCUMENTS

| | | | |
|---|---|---|---|
| 6,324,647 B1 | 11/2001 | Bowman-Amuah | |
| 6,460,141 B1 | 10/2002 | Olden | |
| 6,499,107 B1 | 12/2002 | Gleichauf et al. | |
| 6,535,227 B1 | 3/2003 | Fox et al. | |
| 6,584,569 B2 | 6/2003 | Reshef et al. | |
| 6,941,467 B2 | 9/2005 | Judge et al. | |
| 7,089,581 B1 | 8/2006 | Nagai et al. | |
| 7,194,769 B2 | 3/2007 | Lippmann et al. | |
| 2001/0052108 A1* | 12/2001 | Bowman-Amuah | 717/1 |
| 2002/0194505 A1 | 12/2002 | Muschenbor | |
| 2003/0051026 A1 | 3/2003 | Carter et al. | |
| 2003/0056116 A1 | 3/2003 | Bunker et al. | |
| 2003/0163428 A1 | 8/2003 | Schneck et al. | |
| 2004/0093513 A1 | 5/2004 | Cantrell et al. | |
| 2004/0103315 A1 | 5/2004 | Cooper et al. | |
| 2004/0213258 A1 | 10/2004 | Ramamoorthy | |
| 2005/0080720 A1 | 4/2005 | Betz et al. | |
| 2005/0137119 A1 | 6/2005 | Pageat | |
| 2005/0138110 A1 | 6/2005 | Redlich et al. | |
| 2006/0026682 A1 | 2/2006 | Zakas | |
| 2006/0031932 A1 | 2/2006 | Vail et al. | |
| 2006/0031938 A1 | 2/2006 | Choi | |
| 2006/0059253 A1 | 3/2006 | Goodman et al. | |
| 2006/0117388 A1 | 6/2006 | Nelson et al. | |
| 2006/0143688 A1 | 6/2006 | Futoransky et al. | |
| 2007/0006294 A1 | 1/2007 | Hunter | |
| 2007/0016955 A1 | 1/2007 | Goldberg et al. | |
| 2007/0162890 A1 | 7/2007 | Meier et al. | |
| 2007/0180490 A1 | 8/2007 | Renzi et al. | |
| 2007/0283441 A1 | 12/2007 | Cole et al. | |

(Continued)

OTHER PUBLICATIONS

Kissel et al., "Security Considerations in the System Development Life Cycle", NIST Special Publication 800-64 Revision 2 (online), Oct. 2008.

(Continued)

*Primary Examiner* — Brandon Hoffman
(74) *Attorney, Agent, or Firm* — Occhiuti Rohlicek & Tsao LLP

(57) ABSTRACT

A security assessment method for assessing security of a computerized system under development, the system including assets and being managed in accordance with an organization policy, the method including providing an organizational computerized system development policy; classifying said assets in said system under development, thereby to generate asset classification information; and automated creation of at least one security requirement based on said asset classification information and said organization policy.

39 Claims, 34 Drawing Sheets

U.S. PATENT DOCUMENTS

| | | |
|---|---|---|
| 2008/0047016 A1 | 2/2008 | Spoonamore |
| 2008/0140578 A1 | 6/2008 | Felt et al. |
| 2008/0162390 A1 | 7/2008 | Kapoor et al. |
| 2009/0024663 A1 | 1/2009 | McGovern |
| 2009/0043637 A1 | 2/2009 | Eder |
| 2009/0077666 A1 | 3/2009 | Chen et al. |
| 2009/0099885 A1 * | 4/2009 | Sung et al. ............... 705/7 |
| 2009/0132815 A1 | 5/2009 | Ginter et al. |
| 2009/0178144 A1 | 7/2009 | Redlich et al. |

OTHER PUBLICATIONS

Sharif, "Users Perception of the Information Security Policy at Universiti Teknologi Malaysia", Thesis (online), Apr. 2009.

* cited by examiner

*Fig. 15*

```
<Requirement>
    <Asset>
        Billing system
    </Asset>
    <RelatedThreats>
        <Threat>Buffer Overflow</Threat>
        <Threat>Cross-Site Scripting </Threat>
        <Threat>General Denial of service</Threat>
        <Threat>SQL Injection</Threat>
        <Threat>Viruses, Trojan horses, and worms</Threat>
        <Threat>Loss of personnel</Threat>
        <Threat>Natural Threats</Threat>
        <Threat>Configuration Tampering</Threat>
        <Threat>Data Tampering</Threat>
        <Threat>Disclosure of data to third parties by the
        outsourcing service provider</Threat>
        <Threat>Network Sniffing</Threat>
    </RelatedThreats>
    <ControlGroup>
        <Group>Access Control</Group>
        <Group>Human Resources Security</Group>
    </ControlGroup>
    <Risk>
        <CWeight>4</CWeight>
        <IWeight>4</IWeight>
        <AWeight>0</AWeight>
    </Risk>
    <RequirementText>
        <![CDATA[Make sure that users are aware how to
        control access, protect passwords and equipment.]]>
    <RequirementText>
    <RiskDescription>
        <![CDATA[unauthorized users might gain access to
        the system due to improper handling of user
        credentials]]>
    </RiskDescription>
</Requirement>
```

Fig. 16A

```
<Control>
      <Name>User responsibilities</Name>
      <Standard_ID>ISO27001_11.3</Standard_ID>
      <Asset>
            Billing system
      </Asset>
      <CompoundControls>
            <WCK_ID>I11.3.1</WCK_ID>
            <WCK_ID>I11.3.2</WCK_ID>
            <WCK_ID>I11.3.3</WCK_ID>
      </CompoundControls>
      <InheritControls>
            <WCK_ID></WCK_ID>
      </InheritControls>
      <RelatedAssetTypes>
            <AssetType>Business Process</AssetType>
            <AssetType>Ou</AssetType>
      </RelatedAssetTypes>
      <RelatedThreats>
            <Threat>Buffer Overflow</Threat>
<Threat>Cross-Site Scripting </Threat>
            <Threat>General Denial of service</Threat>
            <Threat>SQL Injection</Threat>
            <Threat>Viruses, Trojan horses, and worms</Threat>
            <Threat>Loss of personnel</Threat>
            <Threat>Natural Threats</Threat>
            <Threat>Configuration Tampering</Threat>
            <Threat>Data Tampering</Threat>
            <Threat>Disclosure of data to third parties by the
            outsourcing service provider</Threat>
            <Threat>Network Sniffing</Threat>
      </RelatedThreats>
      <ControlGroup>
            <Group>Access Control</Group>
            <Group>Human Resources Security</Group>
      </ControlGroup>
      <Weight>8</Weight>
      <ClassificationAvaregeVector>
            <CWeight>4</CWeight>
            <IWeight>4</IWeight>
            <AWeight>2</AWeight>
      </ClassificationAvaregeVector>
      <Values>
            <Questions>
                  <Question>
                        <Text><![CDATA[User Responsibilities: Are users
aware of their responsibility for maintaining effective access
controls, particularly regarding the use of passwords and the security
of user equipment?]]></Text>
                        <QuestionDescription><![CDATA[To prevent
unauthorized user access. The co-operation of authorized users is
essential for effective security. Users should be made aware of their
responsibility for maintaining effective access controls,
```

Fig. 16B

```
particularly regarding the use of passwords and the security of user
equipment.]]></QuestionDescription>
                    <QuestionLevel></QuestionLevel>
                    <Answers>
                        <Answer>
                            <ID>0</ID>
                            <Text><![CDATA[NA]]></Text>
                            <Confidentiality>0</Confidentiality>
                            <Integrity>0</Integrity>
                            <Availability>0</Availability>
                            <Accountability>0</Accountability>
                            <Efficiency>0</Efficiency>
                            <Effectiveness>0</Effectiveness>
                            <Compliance>0</Compliance>
                            <Reliability>0</Reliability>
                            <MaxAssetClassification>0</MaxAssetClassification>
                            <Mitigation></Mitigation>
                        </Answer>
                        <Answer>
                            <ID>1</ID>
                            <Text><![CDATA[Don't know]]></Text>
                            <Confidentiality>0</Confidentiality>
                            <Integrity>0</Integrity>
                            <Availability>0</Availability>
                            <MaxAssetClassification>0</MaxAssetClassification>
                            <Mitigation></Mitigation>
                        </Answer>
                        <Answer>
                            <ID>2</ID>
                            <Text><![CDATA[No]]></Text>
                            <Confidentiality>0</Confidentiality>
                            <Integrity>0</Integrity>
                            <Availability>0</Availability>
                            <MaxAssetClassification>0</MaxAssetClassification>
                            <Mitigation></Mitigation>
                        </Answer>
                        <Answer>
                            <ID>3</ID>
                            <Text><![CDATA[Yes]]></Text>
                            <Confidentiality>5</Confidentiality>
                            <Integrity>5</Integrity>
                            <Availability>4</Availability>
```

Fig. 16C

```
<MaxAssetClassification>5</MaxAssetClassification>

<Mitigation><![CDATA[Make sure that users are aware how to
control access, protect passwords and equipment.]]></Mitigation>
                            </Answer>
                        </Answers>
                </Question>
            </Questions>
    </Values>
    <RiskDescription>
            <![CDATA[unauthorized users might gain access to
        the system due to improper handling of user
        credentials]]>
    </RiskDescription>

</Control>
```

Fig. 17A

| ID | Question | Related Asset Types | Related Threats + threat's probability (0-5) | Related Control Groups | Confidentiality Weight 0-5 | Integrity Weight 0-5 | Availability Weight 0-5 | Risk Description | Development Phase |
|---|---|---|---|---|---|---|---|---|---|
| 1 | Are highly privileged assemblies separated from lower privileged assemblies? | System | Data Tampering (4), Information Disclosure (5) | Configuration Management | 5 | 3 | 1 | A user with insufficient privileges might gain access to unauthorized information | Implementation |
| 2 | Are keys restricted? If a key beneath HKEY_CURRENT_MACHINE is used, the key is configured with a restricted ACL. Alternatively, HKEY_CURRENT_USER is used? | Server | Information Disclosure (5) | Access Control | 4 | 2 | 2 | A user with insufficient privileges might gain access to unauthorized information | Implementation |

Fig. 17B

| | | | | | | |
|---|---|---|---|---|---|---|
| 3 | Is input passed to data access methods that originates outside the current trust boundary constrained? | System | SQL Injection (4), | Access Control | 3 | 4 | Improper input might be used to overpass security mechanisms | Design |
| 4 | Are least-privileged accounts used to connect to the database? | Database | Information Disclosure (5) | Access Control | 4 | 4 | Inappropriate use of user accounts | Design |
| 5 | Is 'windows authentication' used to connect to the database? | Server | Password Cracking (5) | Access Control | 4 | 4 | A user can impersonate different user | Implementation |
| 6 | If SQL Server authentication is used, are the credentials are secured over the network by using IPSec or SSL, or by installing a database server certificate? | SQL Server | Network Spoofing(4), Information Disclosure (5) | Access Control, Configuration Management | 5 | 2 | The SQL server authentication credentials can be compromised | Implementation |
| 7 | Are application connects using a least-privileged account? | System | Information Disclosure (5) | Access Control, Configuration Management | 4 | 4 | A user with insufficient privileges might gain access to unauthorized information | High Level Design |

Fig. 17C

| | | | | | | | |
|---|---|---|---|---|---|---|---|
| 8 | Is sensitive data encrypted in the database using strong symmetric encryption (for example, 3 DES)? | System | Information Disclosure (5) | Access Control, Configuration Management | 5 | 5 | 1 | Sensitive information might be exposed | Design |
| 9 | Are ADO.NET exceptions trapped and logged? | System | Data Tampering (4) | Incident Management | 3 | 2 | 5 | The application DB might be under security attack without the administrator being aware of it | Implementation |
| 10 | How do users authenticate to the system? | System | Password Cracking (5) | Access Control | 3 | 4 | 4 | User might gain unauthorized access to the system by cracking the system's password | High Level Design |

Fig. 18A

| ID | Answer | Control ID | Mitigation | Confidentiality Weight 0-5 | Integrity Weight 0-5 | Availability Weight 0-5 | MaxAssetClassification |
|---|---|---|---|---|---|---|---|
| 1 | No | 1 | | 0 | 0 | 0 | 0 |
| 2 | Yes | 1 | Separate highly privileged assemblies separated from lower privileged assemblies | 5 | 3 | 1 | 5 |
| 3 | No | 2 | | 0 | 0 | 0 | 0 |
| 4 | Partial | 2 | Restrict key access. If a key beneath HKEY_CURRENT_MACHINE is used, make sure the key is configured with a restricted ACL. Alternatively, use HKEY_CURRENT_USER | 2 | 1 | 1 | 3 |

Fig. 18B

| | | | | | | | |
|---|---|---|---|---|---|---|---|
| 5 | Yes | 2 | Restrict key access. If a key beneath HKEY_CURRENT_MACHINE is used, make sure the key is configured with a restricted ACL. Alternatively, use HKEY_CURRENT_USER | 4 | 2 | 2 | 5 |
| 6 | No | 4 | Use least-privileged accounts to connect to the database | 0 | 0 | 0 | 0 |
| 7 | Yes | 4 | Use least-privileged accounts to connect to the database | 4 | 4 | 4 | 5 |
| 8 | Anonymous authentication is allowed | 10 | | 0 | 0 | 0 | 1 |
| 10 | Simple password | 10 | User a simple password to access the system | 1 | 1 | 1 | 2 |

Fig. 18C

| 11 | Complex password | 10 | User s complex password (according to the organization's policy) for authentication | 1 | 2 | 2 | 3 |
| --- | --- | --- | --- | --- | --- | --- | --- |
| 12 | Biometric authentication | 10 | User biometric authentication (e.g. fingerprint, face recognition) to access the system | 4 | 5 | 5 | 5 |
| 13 | No | 7 | | 0 | 0 | 0 | 0 |
| 14 | Yes | 7 | Use least privileged account to access the system. | 5 | 5 | 3 | 3 |

Fig. 20A

| ControlID | CompoundControlID |
|---|---|
| 7 | 4 |
| 10 | 5 |
| 7 | 1 |
|  |  |

Fig. 20B

| ControlID | InheritControlID |
|---|---|
| 4 | 6 |

Fig. 21A

| Question | | | | | Answer | | | |
|---|---|---|---|---|---|---|---|---|
| Text | Weight | Confidentiality | Integrity | Availability | Text | Confidentiality | Integrity | Availability |
| The question | 0-10 | 0-5 | 0-5 | 0-5 | Possible answer 1 | 0-5 | 0-5 | 0-5 |
|  |  |  |  |  | Possible answer 2 | 0-5 | 0-5 | 0-5 |
|  |  |  |  |  | NA | 255 | 255 | 255 |

Fig. 21B

| Question | | | | | Answer | | | |
|---|---|---|---|---|---|---|---|---|
| Text | Weight | Confidentiality | Integrity | Availability | Text | Confidentiality | Integrity | Availability |
| How many external customers in total are using the system? | 3 | 3 | 3 | 3 | 10 | 1 | 1 | 1 |
| | | | | | 100 | 2 | 2 | 2 |
| | | | | | 1000 | 3 | 3 | 3 |
| | | | | | 100000 | 4 | 4 | 4 |
| | | | | | 10000000 | 5 | 5 | 5 |
| | | | | | N/A | 255 | 255 | 255 |
| What is the total cash in the system (temporarily or permanently, credit or debt)? | 4 | 4 | 5 | 4 | 100 | 1 | 1 | 1 |
| | | | | | 1000 | 1 | 2 | 2 |
| | | | | | 100000 | 1 | 3 | 3 |
| | | | | | 10000000 | 4 | 4 | 4 |
| | | | | | 100000000 | 5 | 5 | 5 |
| | | | | | N/A | 255 | 255 | 255 |
| What is the total daily cash flow - (cap level * number of transactions)? | 5 | 5 | 5 | 3 | 10 | 1 | 1 | 1 |
| | | | | | 100 | 2 | 2 | 2 |
| | | | | | 1000 | 5 | 3 | 3 |
| | | | | | 100000 | 5 | 4 | 4 |
| | | | | | 10000000 | 5 | 5 | 5 |
| | | | | | N/A | 255 | 255 | 255 |
| What is the daily profit? | 5 | 5 | 5 | 4 | 10 | 1 | 1 | 1 |
| | | | | | 100 | 2 | 2 | 2 |
| | | | | | 1000 | 3 | 3 | 3 |
| | | | | | 100000 | 4 | 4 | 4 |
| | | | | | 10000000 | 5 | 5 | 5 |
| | | | | | N/A | 255 | 255 | 255 |

Fig. 22

```
<Asset>
      <Name>Billing System</Name>
      <Child Asset Collection>
            <Asset><Name>Oracle Database</Name></Asset>
            <Asset><Name>Apache Server</Name></Asset>
      </Child Asset Collection>
      <Control list />
      <Requirement list>
      <Requirement>
            <RelatedThreats>
                  <Threat>Buffer Overflow</Threat>
                  <Threat>Cross-Site Scripting </Threat>
                  <Threat> General Denial of service</Threat>
                  <Threat> SQL Injection</Threat>
                  <Threat> Viruses, Trojan horses, and worms</Threat>
                  <Threat> Loss of personnel</Threat>
                  <Threat> Natural Threats</Threat>
                  <Threat> Configuration Tampering</Threat>
            </RelatedThreats>
            <ControlGroup>
                  <Group>Access Control</Group>
                  <Group>Human Resources Security</Group>
            </ControlGroup>
            <Risk>
                  <CWeight>4</CWeight>
                  <IWeight>4</IWeight>
                  <AWeight>0</AWeight>
            </Risk>
            <RequirementText>
                  <![CDATA[Make sure that users are aware how to
                  control access, protect passwords and equipment.]]>
            <RequirementText>
            <RiskDescription>
                  <![CDATA[unauthorized users might gain access to
                  the system due to improper handling of user
                  credentials]]>
            </RiskDescription>
      </Requirement>
      </Requirement list>
</Asset>
```

Fig. 23

| ID | Name | Asset Type | Confidentiality Classification (0-5) | Integrity Classification (0-5) | Availability Classification (0-5) |
|---|---|---|---|---|---|
| 1 | E-Banking | System | 5 | 4 | 5 |
| 2 | HR System | System | 5 | 5 | 3 |
| 3 | Server1 | SQL Server | | | |
| 4 | Server2 | Oracle Database | | | |
| 5 | Server3 | Server | | | |
| 6 | Server4 | Server | | | |
| 7 | Internal Portal | System | 2 | 2 | 3 |

Fig. 24

| Parent Asset | Child Asset |
|---|---|
| E-Banking | Server1 |
| E-Banking | Server2 |
| HR | Server1 |
| Internal Portal | Server3 |
| Internal Portal | Server4 |

Fig. 25

```
<AssetType>
      <Name>Database</Name>
      <Inherit Asset Type List>
            <AssetType><Name>SQL Server</Name></AssetType>
      </Inherit Asset Type List>
      <Compound Asset Type List>
      </ Compound Asset Type List>
</AssetType>
```

Fig. 26

| ID | Name |
|---|---|
| 1 | System |
| 2 | Component |
| 3 | Database |
| 4 | SQL Server |
| 5 | Oracle Database |
| 6 | Web Server |
| 7 | Apache web server |
| 8 | Microsoft IIS (Internet Information Server) |

Fig. 28A

| Asset Type | Compound Asset Type |
|---|---|
| System | Component |

Fig. 28B

| Asset Type | Inherit Asset Type |
|---|---|
| Component | Database |
| Component | Web server |
| Database | Oracle DB |
| Database | DB2 |
| Web Server | IIS |
| Web Server | Apache |
| Component | File Server |

Fig. 29

| Question | | | | | Answer | | | |
|---|---|---|---|---|---|---|---|---|
| Text | Weight | Confidentiality | Integrity | Availability | Text | Confidentiality | Integrity | Availability |
| How many external customers in total are using the system? | 3 | 3 | 3 | 3 | 100000 | 4 | 4 | 4 |
| What is the total cash in the system (temporarily or permanently, credit or debt)? | 4 | 2 | 5 | 5 | 100000 | 1 | 3 | 3 |
| What is the total daily cash flow - (cap level * number of transactions)? | 5 | 5 | 2 | 3 | 1000 | 5 | 3 | 3 |
| What is the daily profit? | 5 | 5 | 5 | 4 | 100 | 2 | 2 | 2 |

Fig. 30A

```
<Requirement>

<Asset>
                E-Banking
        </Asset>
        <RelatedThreats>
                <Threat>Buffer Overflow</Threat>
                <Threat>Cross-Site Scripting </Threat>
                <Threat>General Denial of service</Threat>
                <Threat>SQL Injection</Threat>
                <Threat>Viruses, Trojan horses, and worms</Threat>
                <Threat>Loss of personnel</Threat>
                <Threat>Natural Threats</Threat>
                <Threat>Configuration Tampering</Threat>
                <Threat>Data Tampering</Threat>
                <Threat>Disclosure of data to third parties by the
                outsourcing service provider</Threat>
                <Threat>Network Sniffing</Threat>
        </RelatedThreats>
        <ControlGroup>
                <Group>Access Control</Group>
        </ControlGroup>
        <Risk>
                <CWeight>1</CWeight>
                <IWeight>2</IWeight>
                <AWeight>2</AWeight>
        </Risk>
        <RequirementText>
                <![CDATA[User s complex password (according to the organization's policy) for
authentication.]]>
        <RequirementText>
        <RiskDescription>
                <![CDATA[User might gain unauthorized access to the system by cracking the
system's password]]>
        </RiskDescription>
</Requirement>
```

Fig. 30B

```
<Requirement>

<Asset>
                E-Banking
        </Asset>
        <RelatedThreats>
                <Threat>Buffer Overflow</Threat>
                <Threat>Cross-Site Scripting </Threat>
                <Threat>General Denial of service</Threat>
                <Threat>SQL Injection</Threat>
                <Threat>Viruses, Trojan horses, and worms</Threat>
                <Threat>Loss of personnel</Threat>
                <Threat>Natural Threats</Threat>
                <Threat>Configuration Tampering</Threat>
                <Threat>Data Tampering</Threat>
                <Threat>Disclosure of data to third parties by the
                outsourcing service provider</Threat>
                <Threat>Network Sniffing</Threat>
        </RelatedThreats>
        <ControlGroup>
                <Group>Access Control</Group>
        </ControlGroup>
        <Risk>
                <CWeight>5</CWeight>
                <IWeight>3</IWeight>
                <AWeight>3</AWeight>
        </Risk>
        <RequirementText>
                <![CDATA[Use least privileged account to access the system.]]>
        <RequirementText>
        <RiskDescription>
                <![CDATA[A user with insufficient privileges might gain access to unauthorized
information]]>

</RiskDescription>
</Requirement>
```

APPARATUS AND METHODS FOR ASSESSING AND MAINTAINING SECURITY OF A COMPUTERIZED SYSTEM UNDER DEVELOPMENT

CROSS-REFERENCE TO RELATED APPLICATIONS

This application is a continuation in part of co-pending U.S. Utility patent application Ser. No. 11/305,196 entitled "METHOD AND A SOFTWARE SYSTEM FOR END-TO-END SECURITY ASSESSMENT FOR SECURITY AND CIP PROFESSIONALS" and filed 19 Dec. 2005. This application claims priority from co-pending Israel Patent Application No. 205916 entitled "APPARATUS AND METHODS FOR ASSESSING AND MAINTAINING SECURITY OF A COMPUTERIZED SYSTEM UNDER DEVELOPMENT" filed 23 May 2010.

FIELD OF THE INVENTION

The present invention relates generally to computerized systems and to security thereof and more particularly to computerized systems under development.

BACKGROUND OF THE INVENTION

The ACIP project is a European Union initiative directed at providing the European R&D roadmap for Analysis and Assessment of Critical Infrastructure Protection (ACIP). ACIP focuses on research designed to identify and develop tools, methodologies and technologies for the protection of critical infrastructures. One of the major concerns of the ACIP project, according to Gwendal Legrand of the Roadmap For Provision Of Methodologies For CIS Investigations, was the fact that critical infrastructures are becoming targets of increasing physical and cyber attacks. This rose the question of whether the available methods of coping with these attacks are adequate for the enormous task of protecting huge complex networked systems. Perhaps not surprisingly, the answer was that current methods have major deficiencies that need to be dealt with in order to achieve an adequate level of security, i.e., where critical systems can continue to function, even when under attack.

The ACIP project investigated all current methods and found that that even the task of assessing a critical system's security level, an essential and initial task in any attempt to secure a system, cannot be easily done with available methods.

The scope of assessing a security level of operational systems, for example, a nation-wide electronic network, was not taken into account when current methods were planned. No method is capable of assessing hundreds or thousands of servers, various local and wide area networks, as well as standard and proprietary or home-grown systems, etc. The ACIP project determined that software tools already in place may help in such a case, but their major drawback is that they address specific information technology (IT) platforms, and lack an 'overall' security assessment capability. When addressing a complex system with existing tools it is easy to lose sight of the larger picture. Instead of a clear vision of a complex critical system's security level, deeper confusion may result.

Platform-specific tools are readily available, but unfortunately they can be of assistance only if the larger picture becomes clear. There are also several available high-level methods that are not applicable in most CIP instances. Most high level methods detach themselves from actual technical details in an attempt to remain the same even when technologies have changed. Perhaps the best proof for their inapplicability is the finding that the critical infrastructure's (CI's) IT operations staff, by and large, do not use high level methods, since the information that the high level systems provides is often too abstract and fails to provide a practical guide for IT professionals.

Thus, there is a need for a method that may connect both ends—the high level and the platform specific—and would produce results that the IT professionals may be able to use. The new methods must be practical and aware of the organizational issues related to the critical infrastructures.

State of the art software tools for handling security requirements are described inter alia in published US Application 2004/0103315 to Cooper et al, published 27 May 2004; in published US Application 2007/0006294 to Hunter, published 4 Jan. 2007; and in published US Application 2995.9137119 to Redlich, published 23 Jun. 2005.

The disclosures of all publications and patent documents mentioned in the specification, and of the publications and patent documents cited therein directly or indirectly, are hereby incorporated by reference.

SUMMARY OF THE INVENTION

Certain embodiments of the present invention relate to methods and apparatus for security assessment and Risk Management. More particularly, certain embodiments of the present invention relate to a method and a software system for security assessment for Security and CIP (Critical Infrastructure Protection) professionals for large, complex, critical infrastructure (LCCI) systems.

Certain embodiments of the present invention seek to provide a method and software system for Security and CIP Professionals (CIP) that addresses the shortcomings in today's Critical Infrastructure Protection (CIP) methods, and offers a new security assessment methodology equipped to meet the present challenges of CIP, as well as future challenges. The method is based on a Security Assessment that provides a wide examination of system information flows. The method disclosed may be used for implementing security assessment for use by Security and CIP professionals for large, complex, critical infrastructure (LCCI) systems. The first step of the method is determining security policy and sensitivity levels of data. Further steps may include some or all of identifying and analyzing critical organization-derived information flows for the layers, security mechanisms, formats and communications protocols of the system; assessing each of the information flows for security gaps; determining the risk level of each of the information flows by applying a formula that takes into account the threat, its likelihood and its potential impact on the system; comparing the required defense levels to the security mechanisms, listing all gaps found according to a prioritization process that determines the urgency of closing each gap and creating a detailed list of the prioritized gaps; and offering specific countermeasures to close each of the gaps, wherein emphasis is put on optimizing the countermeasures.

Accordingly, it is an object of certain embodiments of the present invention to overcome the limitations of the prior art, and provide a method and software system for security assessment for Security and CIP professionals.

It is another object of certain embodiments of the present invention to provide an improved method that may complement, rather than replace, existing methods.

When managing and assessing security risks on IT assets, the production environment is usually referenced and the risks found are an indication for some security breach that might be used to create damage/loss for the organization.

Security, and in particular IT security damage, can be quantified as a combination of damage to one or more of confidentiality (e.g. confidential information is exposed/stolen etc), integrity (e.g. the information has been changed) or availability (e.g. the asset and/or the information the asset holds is unavailable due to a security breach).

When developing a computer system, there are different development phases that take place as part of the development process. These phases and the development process are often referred to as SDLC—software development lifecycle. SDLC—Systems Development Life Cycle—is an example of a logical process used to develop an IT system, including different phases.

By inserting different security requirements to the SDLC some security risks may be avoided that might be found in the production environment in the 'standard' risk assessment process.

For example, when checking a system one may discover that there is a risk for information disclosure due to the fact that there is a weak password. If, during the development of that system there was a security requirement to have a complex password, this risk could have been avoided.

The SSDLC module provides a way for generating a set of security requirements for assets in different development phases.

It is a further object of certain embodiments of the present invention to provide an improved method that may provide a centralized security approach to decentralized environments.

A method is disclosed for implementing security assessment for use by Security and CIP professionals for large, complex, critical infrastructure (LCCI) systems. The first step of the method is determining security policy and sensitivity levels of data. Further steps may include some or all of identifying and analyzing critical organization-derived information flows for the layers, security mechanisms, formats and communications protocols of the system; assessing each of the information flows for security gaps; determining the risk level of each of the information flows by applying a formula that takes into account the threat, its likelihood and its potential impact on the system; comparing the required defense levels to the security mechanisms, listing all gaps found according to a prioritization process that determines the urgency of closing each gap and creating a detailed list of the prioritized gaps; and offering specific countermeasures to close each of the gaps, wherein emphasis is put on optimizing the countermeasures.

In most Critical Infrastructures the IT systems are by definition distributed. The extent of distribution has been growing in the last few years and has several dimensions: geographical; organizational; functional; and technological distribution into sub-systems and outsourcing implications. The distributed nature of the systems also produces a responsibility distribution, and therefore systems are being addressed and maintained as independent parts. As a result, there is a growing tendency in security gaps.

A central point of view to security assessment processes provides the ability to address a system as a whole, and not as a set of different components with different responsibilities. In many cases one can avoid the penalty for performing security measures, if the desired security level is achieved through other parts of the system. As a result of this need, the new paradigm should make sure that all the relevant aspects and components of the distributed system are taken into consideration in the security assessment. This may be possible by performing a system-wide assessment, and by closely examining major information flows.

There is an absence of a practical and ready to use method. This is a further elaboration of the issue of high-level methods and platform-based methods discussed above. Security methodologies often tend to be highly theoretical, while security practices are often highly technical and lack a structured approach. The new method should aim at connecting the two, with a comprehensive bridging approach.

There is thus provided, in accordance with at least one embodiment of the present invention, a security assessment method for large, complex systems, the system comprising identifying organization-derived information flows of a large, complex system; assessing each of the organization-derived information flows for security gaps; listing all gaps found according to a prioritization process which includes determining the urgency of closing each gap; and offering countermeasures to close the gaps, wherein emphasis is put on optimizing the countermeasures based on the prioritization process.

Further in accordance with at least one embodiment of the present invention, the determining includes determining the risk level of each of the information flows taking into account, for at least one threat pertaining to the information flow, the threat's likelihood and potential impact on the system.

Also provided, in accordance with at least one embodiment of the present invention, is a security assessment method for large, complex systems, the system comprising analyzing organization-derived information flows of a large, complex system so as to identify critical information flows from among the organization-derived information flows; determining security policy of an organization including sensitivity levels of data and assessing the critical information flows for security gaps accordingly; and offering countermeasures to close the gaps.

Further in accordance with at least one embodiment of the present invention, the method also comprises listing all gaps found according to a prioritization process which includes determining the urgency of closing each gap, wherein, when offering countermeasures to close the gaps, emphasis is put on optimizing the countermeasures based on the prioritization process.

Additionally in accordance with at least one embodiment of the present invention, the assessing for security gaps comprises assessing only the critical information flows for security gaps.

Also provided, in accordance with at least one embodiment of the present invention, is a security assessment method for assessing security of a computerized system under development, the system including assets and being managed in accordance with an organization policy, the method including providing an organizational computerized system development policy, classifying the assets in the system under development, thereby to generate asset classification information; and automated creation of at least one security requirement based on the asset classification information and the organization policy.

Further provided, in accordance with at least one embodiment of the present invention, is a security assessment method for assessing security of a computerized system under development and having at least one security requirement, the method comprising computing a control target level for at least one control existing in a computerized system under development; and using the control target level to set a risk level for the at least one security requirement.

Also provided, in accordance with at least one embodiment of the present invention, is a security assessment method for assessing security of a computerized system under development, the method comprising providing at least one initial security requirement definition which applies while the system under development is in a first phase of development: and translating the at least one initial security requirement that pertains to the first phase to a more detailed security requirement that pertains to a subsequent phase of development.

Further in accordance with at least one embodiment of the present invention, the first phase comprises a design phase.

Still further in accordance with at least one embodiment of the present invention, the subsequent phase comprises an implementation phase.

Additionally in accordance with at least one embodiment of the present invention, the first and subsequent phases comprise SDLC (Software Development Lifecycle) phases.

Further in accordance with at least one embodiment of the present invention, the initial security requirement stipulates a desired strength of encryption and the more detailed security requirement stipulates technology to implement the desired strength of encryption.

Still further in accordance with at least one embodiment of the present invention, the policy includes a stipulation of at least one individual required encryption scheme for at least one individual class of assets.

Additionally in accordance with at least one embodiment of the present invention, the class of assets includes an asset whose importance from a viewpoint of asset confidentiality maintenance falls within a stipulated range.

Also in accordance with at least one embodiment of the present invention, the class of assets includes an asset whose importance from a viewpoint of asset integrity maintenance falls within a stipulated range.

Further in accordance with at least one embodiment of the present invention, the class of assets includes an asset whose importance from a viewpoint of asset availability maintenance falls within a stipulated range.

Further in accordance with at least one embodiment of the present invention, the policy includes a stipulation of at least one of a server installation process, and an IT hardware configuration process.

Additionally in accordance with at least one embodiment of the present invention, the asset classification information quantifies the asset's importance from a viewpoint of at least one of asset confidentiality maintenance, asset integrity maintenance and asset availability maintenance.

Further in accordance with at least one embodiment of the present invention, the automated creation includes generating a security requirement for the at least one required encryption scheme vis a vis each individual asset which, according to the asset classification information, belongs to the individual class of assets.

Additionally in accordance with at least one embodiment of the present invention, the computing the target level includes combining a CIA vector characterizing an individual control for an individual asset with the asset's CIA classification vector, thereby to generate a numerical value; and using the numerical value in searching through the controls' different answers to select which answer will satisfy the individual control for the individual asset.

Also provided, in accordance with at least one embodiment of the present invention, is a computer program product, comprising a computer usable medium having a computer readable program code embodied therein, the computer readable program code adapted to be executed to implement a security assessment method for assessing security of a computerized system under development, the system including assets and being managed in accordance with an organization policy, the method including providing an organizational computerized system development policy; classifying the assets in the system under development, thereby to generate asset classification information; and automated creation of at least one security requirement based on the asset classification information and the organization policy.

Additionally provided, in accordance with at least one embodiment of the present invention, is a computer program product, comprising a computer usable medium having a computer readable program code embodied therein, the computer readable program code adapted to be executed to implement a security assessment method for assessing security of a computerized system under development and having at least one security requirement, the method comprising computing a control target level for at least one control existing in a computerized system under development; and using the control target level to set a risk level for the at least one security requirement.

Further provided, in accordance with at least one embodiment of the present invention, is a computer program product, comprising a computer usable medium having a computer readable program code embodied therein, the computer readable program code adapted to be executed to implement a security assessment method for assessing security of a computerized system under development, the method comprising providing at least one initial security requirement definition which applies while the system under development is in a first phase of development: and translating the at least one initial security requirement that pertains to the first phase to a more detailed security requirement that pertains to a subsequent phase of development.

Also provided, in accordance with at least one embodiment of the present invention, is a security assessment device for assessing security of a computerized system under development, the system including assets and being managed in accordance with an organization policy, the device including asset classification apparatus classifying the assets in the system under development, thereby to generate asset classification information; and a requirement generator for automated creation of at least one security requirement based on the asset classification information and an organizational computerized system development policy.

Yet further provided, in accordance with at least one embodiment of the present invention, is a security assessment device for assessing security of a computerized system under development and having at least one security requirement, the device comprising a control target level computer operative for Computing a control target level for at least one control existing in a computerized system under development; and a security requirement risk level generator using the control target level to set a risk level for the at least one security requirement.

Further provided, in accordance with at least one embodiment of the present invention, is a security assessment device for assessing security of a computerized system under development, the device comprising a requirement database including at least one initial security requirement definition which applies while the system under development is in a first phase of development; and a requirement translator operative for translating the at least one initial security requirement that pertains to the first phase to a more detailed security requirement that pertains to a subsequent phase of development.

Further in accordance with at least one embodiment of the present invention, the using includes selecting a control target, setting the security requirement risk level as the CIA vector of the answer whose control's MaxAssetClassification value is greater than or equal to the difference between the already-computed requirement risk level and the CIA vector value of the first (less good) answer for the control.

Additional features and advantages of the invention may become apparent from the following drawings and description.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which:

FIG. 15 is a diagram depicting a suitable data structure for a Requirement in xml file form.

FIGS. 16A-16C, taken together, form a diagram depicting a suitable data structure for a control in xml file form.

FIGS. 17A-17C, taken together, form a diagram depicting a suitable data structure for storing controls.

FIGS. 18A-18C, taken together, form a table suitable for storing answers obtained while operating a security assessment method in accordance with any of the embodiments of the present invention.

FIG. 20A is an example of a compound connection table, the control and compound control IDs being in accordance with the table of FIGS. 17A-17C.

FIG. 20B is an example of an inherit connection table, the control and inherit control IDs being in accordance with the table of FIGS. 17A-17C.

FIG. 21A is an example of an Asset Classification Questionnaire, in table form.

FIG. 21B is an example of a populated classification questionnaire, in table form.

FIG. 22 is a Data structure diagram of a typical asset.

FIG. 23 is a table to support mapping of each asset to its compound asset.

FIG. 24 is a table showing example relationships between assets.

FIG. 25 is a data structure diagram showing an example of a suitable asset type data structure.

FIG. 26 is a table showing an example of an Asset Type hierarchy.

FIG. 28A is an example of a Compound Asset Type table.

FIG. 28B is an example of an Inherit Asset Type table.

FIG. 29 is a table showing how example data may populate the table of FIG. 21B.

FIG. 30A is a data structure diagram showing how a requirement may be created out of a first example control, termed in the illustrated example "control ID 10", e.g. as per step 1060 of FIG. 10.

FIG. 30B is a data structure diagram showing how a requirement may be created out of a second example control, termed in the illustrated example "control ID 7", e.g. as per step 1060 of FIG. 10.

DETAILED DESCRIPTION OF CERTAIN EMBODIMENTS

The invention may now be described in connection with certain embodiments with reference to the following illustrative figures so that it may be more fully understood. References to like numbers indicate like components in all of the figures.

Figure 1:
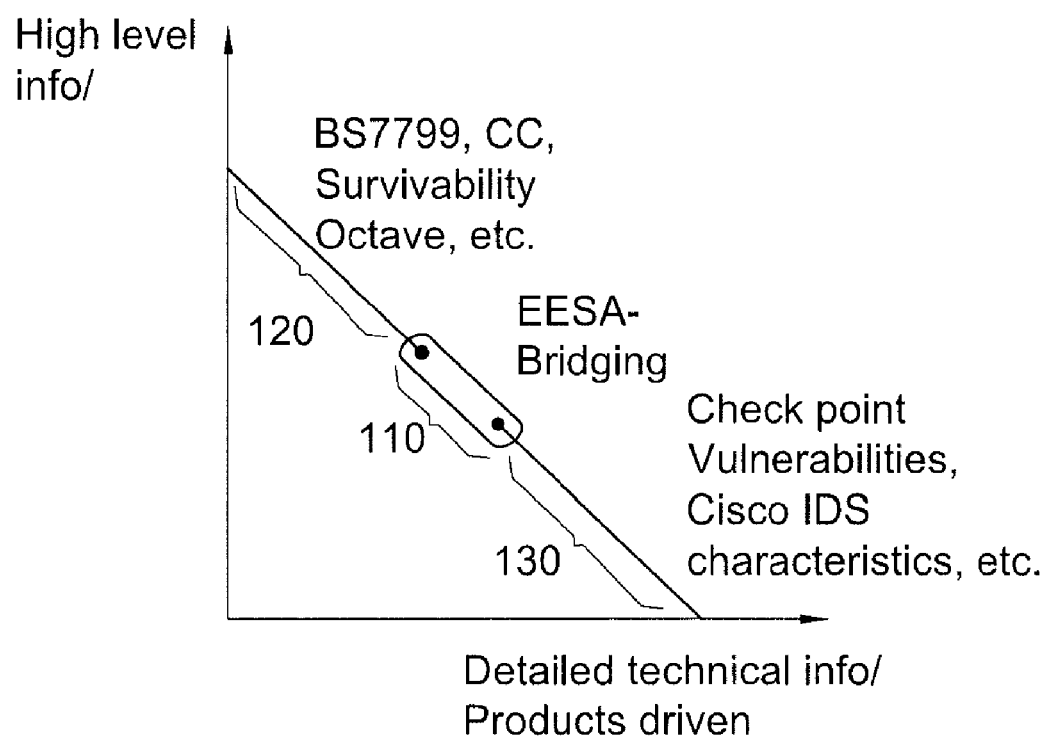
FIG. 1 is a schematic illustration of bridging the gap between existing methods, according to an embodiment of the present invention.

Reference is now made to FIG. 1, which is a schematic illustration of bridging the gap 110 between existing methods 120 and 130, according to an embodiment of the present invention.

Theoretical approaches are often seen in academic research and the work of standard bodies. The approaches are usually high-level and are "built to last"—refraining as much as possible from discussing particular technologies, let alone products. Their main advantage is that they can be adapted to any environment, however their lack of practicality make them difficult to implement.

Technical practices often include vast amounts of information regarding products and solutions. Examples are operating system (OS) vulnerabilities, necessary patches for each OS, known exposures in particular applications and how to prevent them, etc. This knowledge does not amount to a systematic approach to security, and is closely associated with particular environments. It does not help in cases where system interdependencies are involved.

Finally, there is a major flaw in most existing methods. Even though the methods view the systems as wholes comprised of components, their focus is securing each and every component, rather than the system as a whole.

The present invention attempts to bridge both types of approaches by providing a comprehensive approach. On the one hand it should provide high-level and cross-environmental methodologies and give an answer for differing environments. On the other hand it should go into detail and analyze the most fundamental components of the systems, and thereby answer the most practical questions in each project.

Thus by design, the method of the present invention can be used as a complementary method. It is designed to complement accepted methodologies, such as the Common Criteria, Survivability and BS 7799 (120). It typically concentrates on integrating into existing methodologies and, more specifically, on providing a "ready to use" assessment tool for critical systems.

The most dangerous organization- or transaction-related combined internal and external attacks today, that put critical infrastructures at risk, are sophisticated attacks, often perpetrated with the aid of internal employees, that take advantage of the specific characteristics of the system, and that are carried out by highly professional and well funded groups like terrorists or crime organizations that often study and use attack methods that are carried out by governmental organizations.

Most of today's solutions are designed to prevent external attacks only, mostly Internet attacks, and have generic-not-aware-of-specific-characteristics. The proposed assessment process must perform an analysis, covering security mechanisms that protect from external breaches, as well as address internal security mechanisms.

It has recently become clear to countries around the world that protecting critical infrastructures has been neglected in the last few years. The gaps are especially wide because of the major technological advances of recent years in critical infrastructure systems. Many critical systems are especially difficult to protect with older methods and mechanisms, because the systems are more complex and highly distributed than before. In many cases very limited inherent security is found in the systems, even though the need for a high security level is clear. Furthermore, it is impossible to properly analyze critical infrastructures without a deep understanding of the relationship between the physical and the cyber infrastructures. And perhaps the most difficult issue to tackle is the interdependencies among the different systems, which complicates the security issues as well as creates a major risk—the risk of a collapse of not one, but two or more critical systems in case of an attack.

A major issue in this field is the requirement for a better understanding of the specific needs of each CI sector and the specific ways to protect it. The security vendors provide off-the-shelf solutions for security purposes. These products give generic abilities, and are not customized for the specific needs of each sector. While the industry at large may find this satisfactory, CIP managements are starting to understand that there is a need for more adequate solutions.

The method provided in accordance with certain embodiments of the present invention is inherently designed to analyze the specific organizational needs and specific information flows in each system and translate them to security requirements. This addresses the critical infrastructure's special security needs, and is suitable both for securing existing critical IT systems and for designing new highly critical and dependable ones.

There is provided a security assessment method that was developed especially for distributed critical systems. The method is based on the identification of critical information flows within a system, and an analysis of the security services along each information flow.

The method analyzes the "Security Quality of Service" (SQOS) along the critical information flows, and checks whether the security mechanisms are adequate for protecting against probable threats. The method further analyzes the threats that the mechanisms do protect against, the ones that it may not be able to thwart and suggests corrective measures that bring the system up to the required security level.

One of the main principles underlying the method is the analysis of a process that can span many sub-systems. The analysis may begin at an employee's workstation, pass through several servers in several countries, leave the organization and go through a hosted server, return to the organization and end in a transaction at a remote database. The process may pass through several protocols and formats as well, starting as an html page sent via http to a web server, changing to JAVA on its way to an application server, then proceeding to SQL over JDBC to the database, etc. The analysis keeps track of the entire path, and checks each and every station on the way and the gaps created by the changes in every stage of the process. The disclosed method addresses some or all of: gaps that can be created by technology changes; organizational distribution and lack of clarity regarding security responsibilities; system distribution and lack of clarity regarding security levels within the different sub-systems; and limitations in the organization and the process/environment.

Since the method views the system as a collection of organization-derived information flows, and systematically analyzes their needs, it can eventually lead to best practices in system design and system architecture design, methods of risk analysis and internal or external security reviews.

Figure 2:
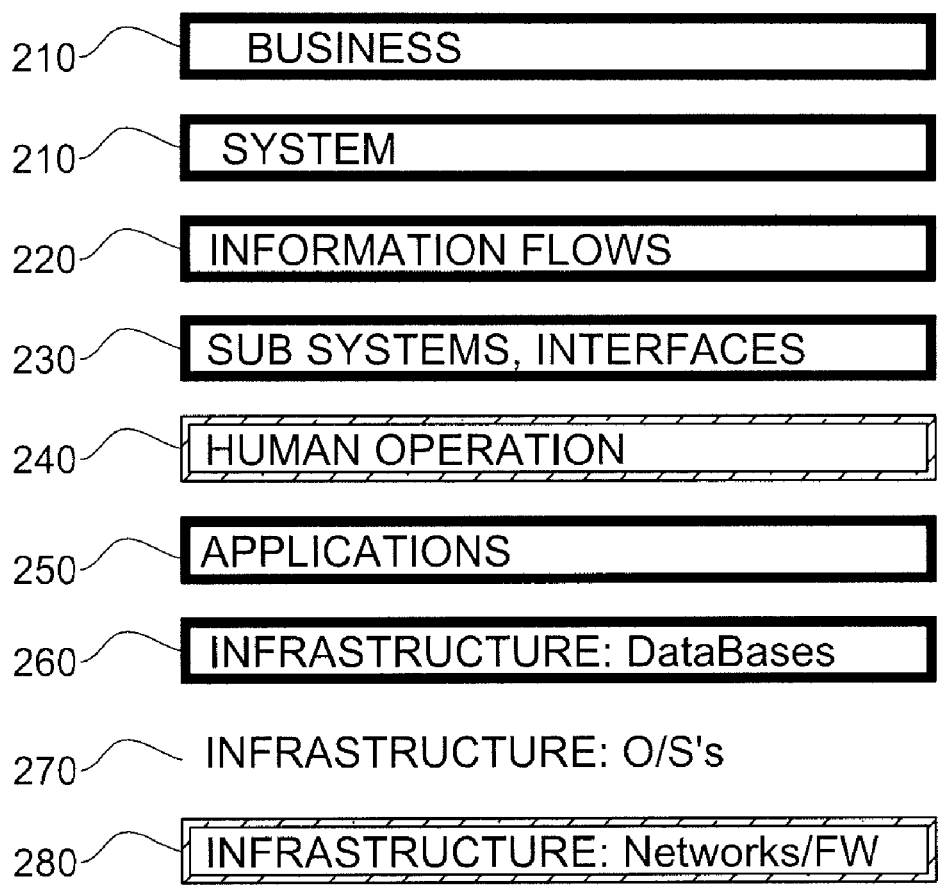
FIG. 2 is a schematic block diagram of the top-down approach method, according to an embodiment of the present invention.

FIG. 2 is a schematic block diagram of the top-down approach method, according to one embodiment of the present invention. This provides better understanding of the risks and better countermeasure recommendations, and thereby leads to a higher level of security in the assessed systems. The disclosed method's strength is in its assessment approach that is based on analyzing the organizational processes 210 and the information flows 220 derived from them. Along information flows 220, a more detailed look at the sub-systems 230 is performed, going into the human aspects of the activity 240, and drilling down to the application platforms 250 and lower to the infrastructure components such as OS 260, databases 270 and network devices 280. This strategy provides numerous advantages and a better basis for approaching the other phases of security assessment, such as risk analysis and gap analysis, and can be used in various phases of the project lifecycle.

Figure 3:
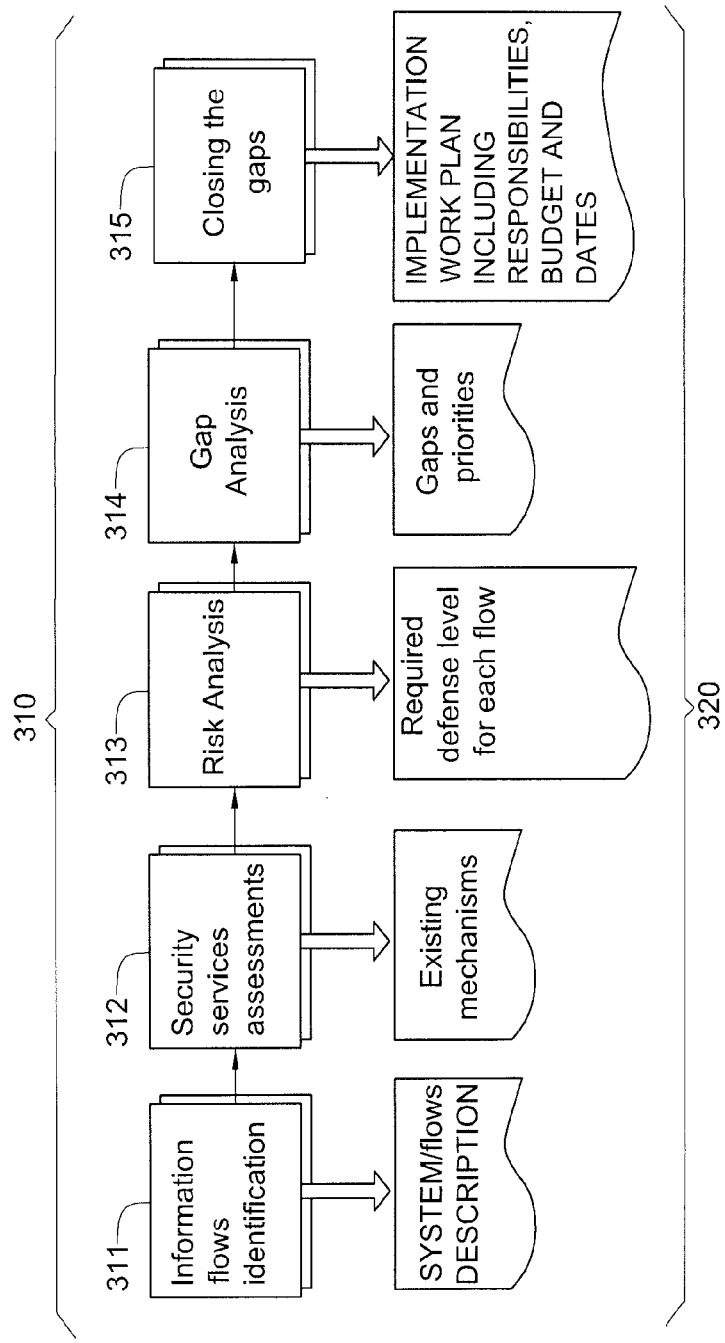
FIG. 3 is a schematic block diagram of the five phases of security assessment, according to one embodiment of the present invention.

FIG. 3 is a schematic block diagram of the five phases 310 and deliverables 320 according to one embodiment of the present invention. The illustration shows deliverables 320—documents, reports and work plans—that are produced at each stage. Most of phases 310 are not unique to, but are part of known security practices throughout the world. A new approach to phases 1 and 2 is provided, which analyzes the system. A brief description of the phases is provided below.

Before beginning the analysis, an understanding of the organization's general security requirements must be achieved. This may include, among other things, some or all of the sensitivity levels of various data, the security policy and other information.

Figure 4:
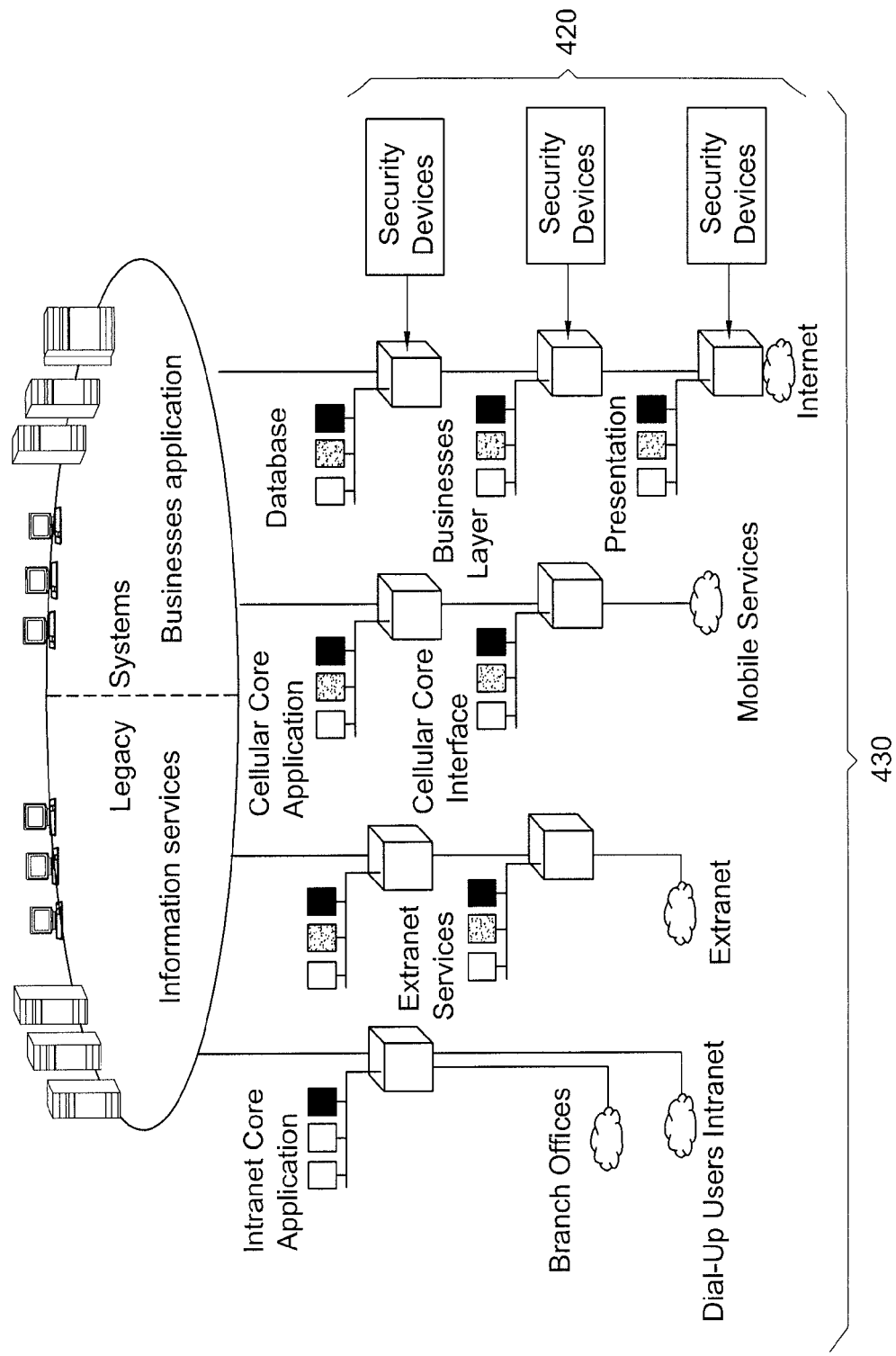
FIG. 4 is a schematic illustration of the information flow, according to one embodiment of the present invention.

Phase I—Critical Information Flows Identification 311: FIG. 4 is a schematic illustration of the information flow, according to one embodiment of the present invention. The first stage involves a deep analysis of the system processes from an organizational point of view. This is in order to identify and analyze the main information flows in the system. As seen in FIG. 4, an information flow can traverse several layers, several security mechanisms 420 as well as several technologies, including different formats and communication protocols 430.

Phase II—Security Services Assessment 312: At this stage each information flow identified in Phase I, is examined from a security point of view. It is here that many deficiencies that are usually missed by existing methods are found.

Assessment of Security mechanisms for each security service is done with a centralized approach and is the heart of the process.

Assessment of Security mechanisms is done for each security service (Identification, authentication, authorization . . . ). Service is the global security area and a mechanism is a specific way to implement it.

For each service, assess the mechanisms along the flow e.g. some or all of:
Existing mechanisms;
End to end continuity, uncovered areas;
Defense level of each security mechanism; and
defense level (Dependencies between different mechanisms for each service); and
Assess the dependencies between different services (especially in case of gaps).

This assessment may allow identification and remediation of vulnerabilities in phase III that could not be traced otherwise. All of the security weaknesses found at this stage are noted, but in most cases recommendations for closing the gaps are only made at Phase V, after the security requirements have been clearly defined.

The security services may include some or all of:
identification;
authentication;
authorization;
access control;
confidentiality;
non-repudiation;
data-integrity;
auditing, alerts; and
availability.

The security services are implemented that are needed to answer the potential threats throughout an "Information stream." Typically, all the services are covered.

Access control, for example, determines whether something is allowed within the system. Non-repudiation means that once an activity has been done, it cannot be denied that it has been done. Confidentiality can be implemented, for example, with a specific encryption of VPN or WinZip™.

For example, authentication can be implemented in different ways for the computer, the router, the first Web server and the database.

Phase III—Risk Analysis 313: Risk analysis 313 that is carried out at this stage determines the risk level in each information flow, and in the system as a whole. The potential threats are derived from potential attack scenarios/attack trees. The likelihood of each impact is also taken into account, and the risk level is determined by a formula that takes into account the threat, its likelihood and its potential impact.

Phase IV—Gap Analysis 314: During the Gap Analysis phase the required defense levels (preliminarily achieved) are compared to the existing security mechanisms. During this phase all of the gaps are listed. A prioritization process that determines the urgency of closing each gap follows. The end result is a detailed list of the prioritized gaps.

Phase V—Closing the Gap—Architecture Design 315: At this stage specific countermeasures are offered to close each of the gaps uncovered at the previous phase. Focus is put on optimizing the recommended solutions, i.e., the different risks are addressed as a whole, and the system is again looked upon as a set of organization-derived information flows, so that the countermeasures may ensure the adequacy of the entire system's level of security. A detailed implementation work plan is created at this stage, which may include some or all of the technical processes as well as the responsibilities, budget and timetable. An analysis of the residual risks, i.e. the risks that remain after all counter-measures are carried out, completes this phase and the assessment process.

Figure 5:
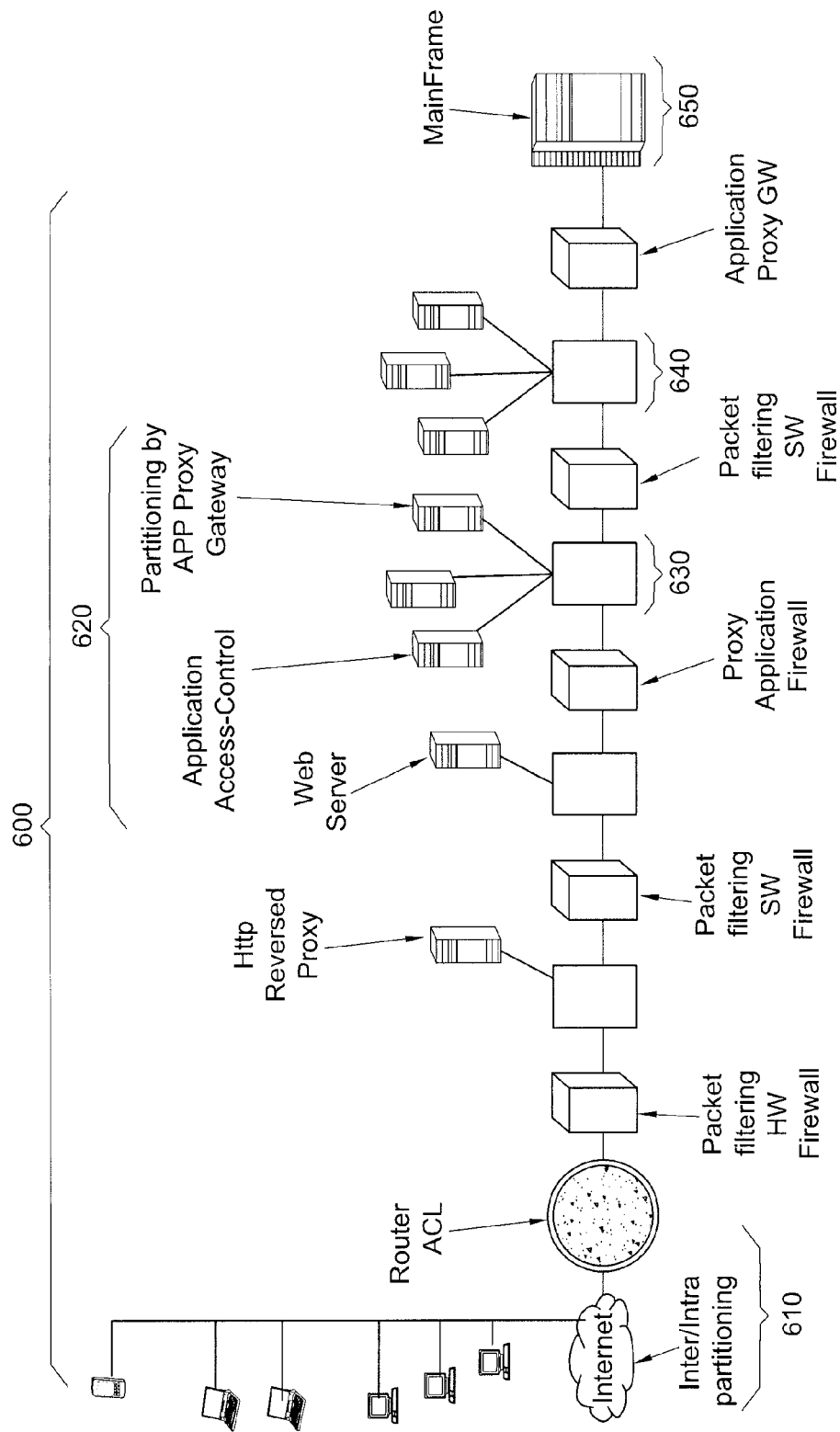
FIG. 5 is a schematic illustration of an exemplary access control mechanism, according to one embodiment of the present invention.

FIG. 5 is a schematic illustration of an exemplary access control mechanism having several application tiers 600, according to one embodiment of the present invention. FIG. 5 illustrates the need for cross-platform and multi-layered Access Control. The application tiers with any respective access control mechanisms may include some or all of:
 a user: a browsers 610;
 presentation: portal and Web server 620;
 organizational logic:
 an application 630;
 databases 640; and
 mainframes 650.

Figure 6:
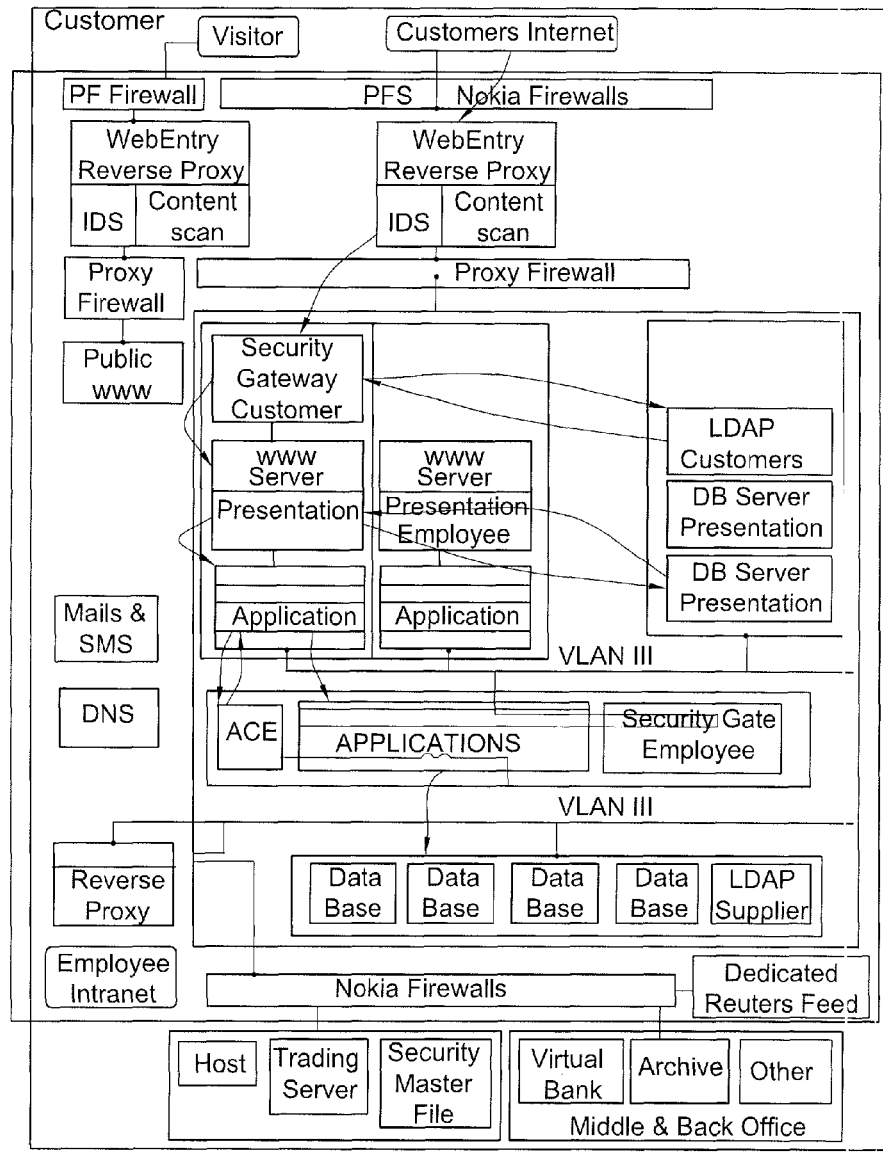
FIG. 6 is a schematic illustration of an exemplary assortment of access control mechanisms involved in a cash transfer, according to one embodiment of the present invention.

FIG. 6 is a schematic illustration of an exemplary assortment of access control mechanisms involved in a cash transfer 700, according to one embodiment of the present invention including some or all of:
 network partitioning (internet/intranet);
 packet filtering firewall 710;
 reversed proxy 720;
 security gateway 740;
 web server access control;
 OS access control;
 application partitioning;
 core application access control;
 database access control; and
 application firewall 730.

Figure 7:
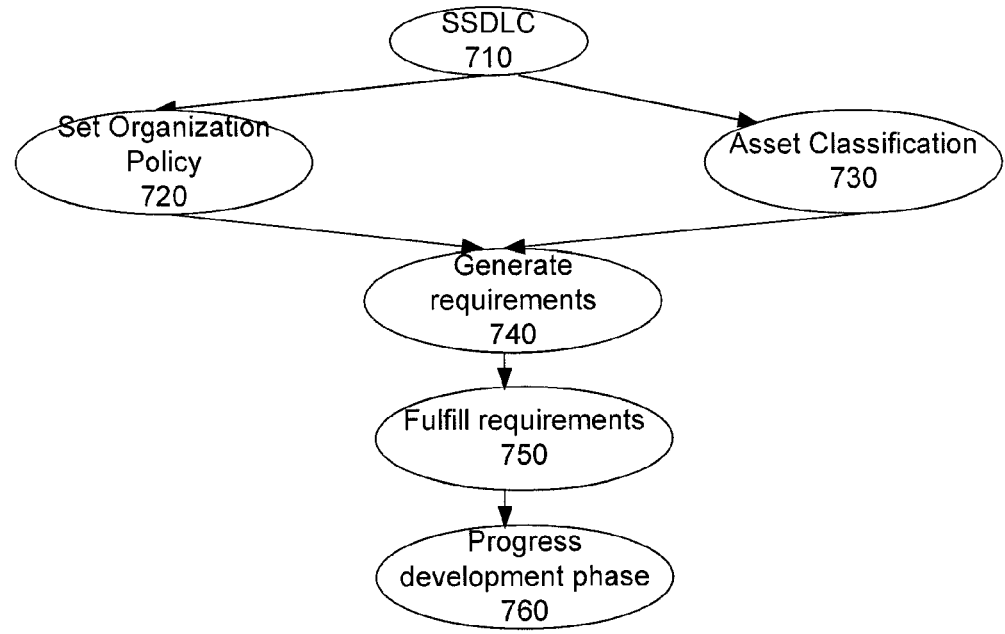
FIG. 7 is a simplified flowchart illustration of an SSDLC method constructed and operative in accordance with certain embodiments of the present invention.

FIG. 7 is a simplified flowchart illustration of an SSDLC method constructed and operative in accordance with certain embodiments of the present invention. The method of FIG. 7 typically includes some or all of the following steps, suitably ordered e.g. as shown:

Step 720: Set Organization Policy

This process involves the uses that may create structures of controls and connections between the controls which may be stored in a DB for later steps.

Step 730: Asset Classification

This process involves the receiving information flows from an external source and setting the classification for each of the assets that take part of these information flows.

Step 740: Generate Requirements

This process generates a set of requirements for a selected asset with specific characteristics according to the asset's classification and the organization policy (as set in steps 720 and 730)

Step 750: Progress Development Phase

Figure 8:
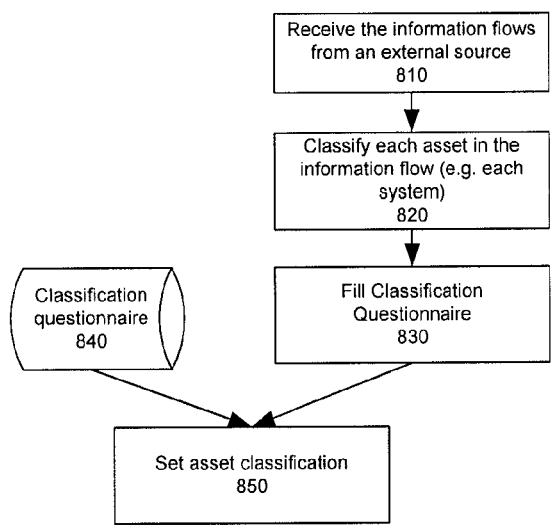
FIG. 8 is a simplified flowchart illustration of a method for performing asset Classification according to one embodiment of the present invention.
Figure 9:
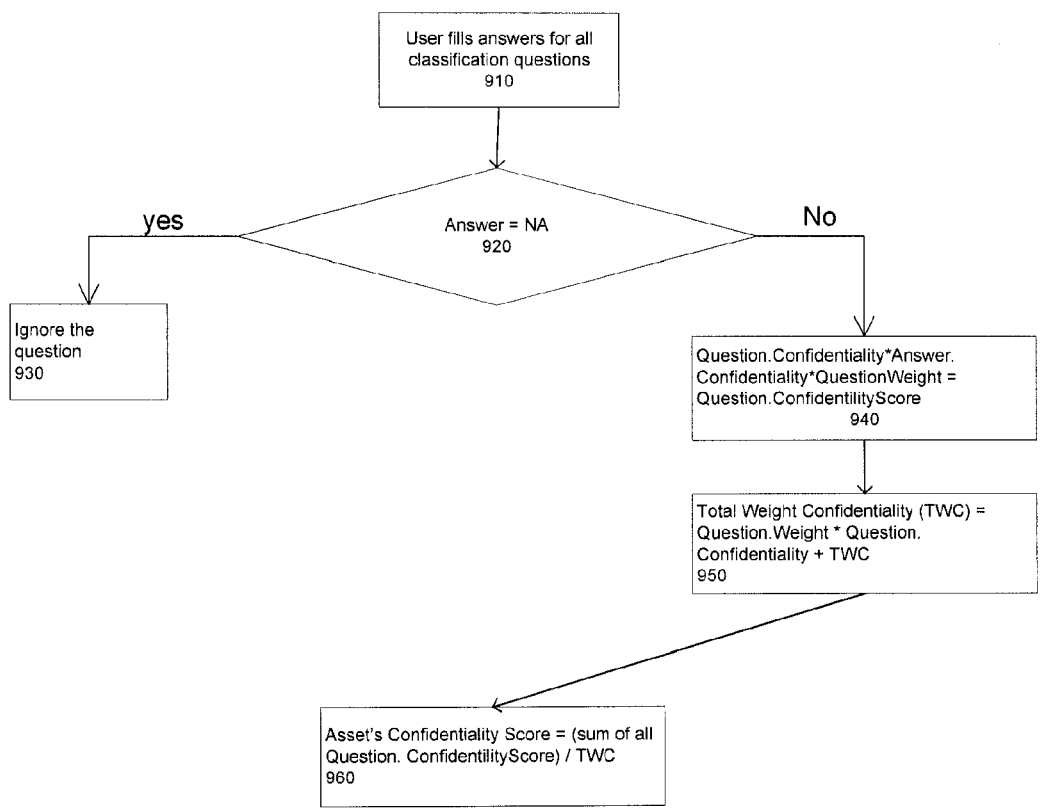
FIG. 9 is a simplified flowchart illustration of a method for performing step 830 of FIG. 8.

This process may exchange requirements relevant to one development phase with other requirements for the next development phase. A method for asset Classification is shown in FIG. 8. The method is constructed and operative in accordance with certain embodiments of the present invention and typically includes some or all of the illustrated steps, suitably ordered e.g. as shown. The process of asset classification uses the data structure of the classification table of FIG. 21A that contains the questionnaire for classification+the different parameters. After receiving the data flows in step 810, the user fills in the answers of the classification questionnaire (step 830). Once the classification questionnaire is filled in, the system computes the values of the asset classification (in terms of Confidentiality, Integrity and Availability) by using the method below:

FIG. 9 is a simplified flowchart illustration of a method for performing step 830 of FIG. 8. The method of FIG. 9, in accordance with certain embodiments of the present invention, includes some or all of the illustrated steps, suitably ordered e.g. as shown. Typically, in FIG. 9, if answer.Text=N/A—ignore the question. Otherwise:

For each question+answer. Compute the question score as:

Question.Confidentiality*Answer.Confidentiality*QuestionWeight=Question.ConfidentilityScore Question.Confidentiality is the Confidentiality column of the Question of the Table of FIG. 21A Answer.Confidentiality is the Confidentiality column of the Answer of the Table of FIG. 21A Question.QuestionWeight is the Weight column of the Question of the Table of FIG. 21A Question.ConfidentilityScore is a temporary variable for each question holding the confidentiality score of this question for next steps of the method Total Weight Confidentiality (TWC)=Question.Weight*Question. Confidentiality+TWC Asset's Confidentiality Score=(sum of all Question.ConfidentilityScore)/TWC TWC is a temporary variable holding the accumulated confidentiality weight for next steps of the method. In step 960 of the method the Asset's Confidentiality Score is the values set in Table of FIG. 23.

Generate requirements step 1740 in FIG. 7 is now described in detail with reference to the flowchart of FIG. 10. The method of FIG. 10, in accordance with certain embodiments of the present invention, includes some or all of the illustrated steps, suitably ordered e.g. as shown. Typically, generating the security requirements takes as input some or all of the following:

a. The asset (the one requirements may be created on), b. The relevant threats—this is a list of selected threats (from the known threats that are part of the policy in the control structure)

c. The relevant security areas—this is a list of selected security areas (from the known security areas in the control structure)

d. The development phase—a selected phase that indicates to the current/starting phase which requirements should be relevant—e.g. software detailed design phase/implementation phase/testing.

Figure 10:
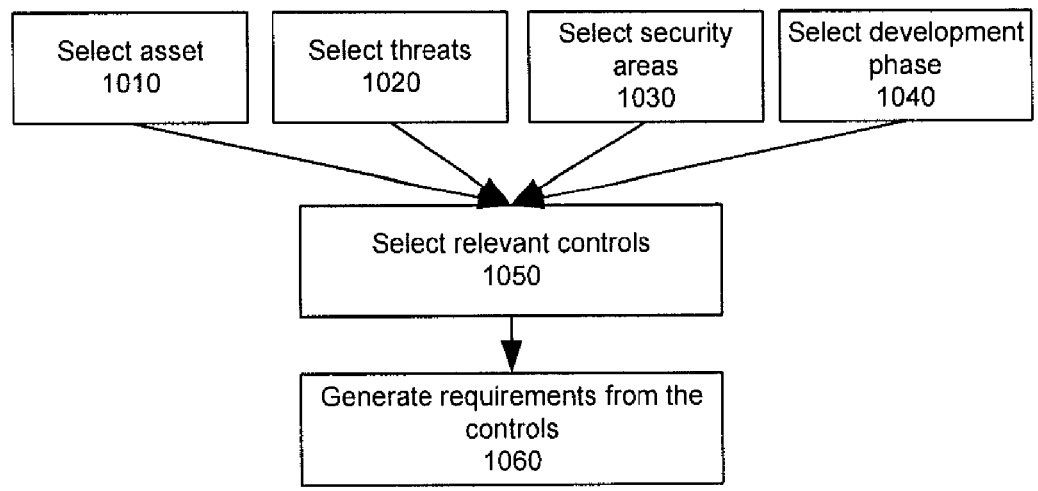
FIG. 10 is a simplified flowchart illustration of a method for performing Generate requirements step 740 in FIG. 7.

FIG. 10 general requirements creation

Step 1050: Select Relevant Controls

Figure 11:
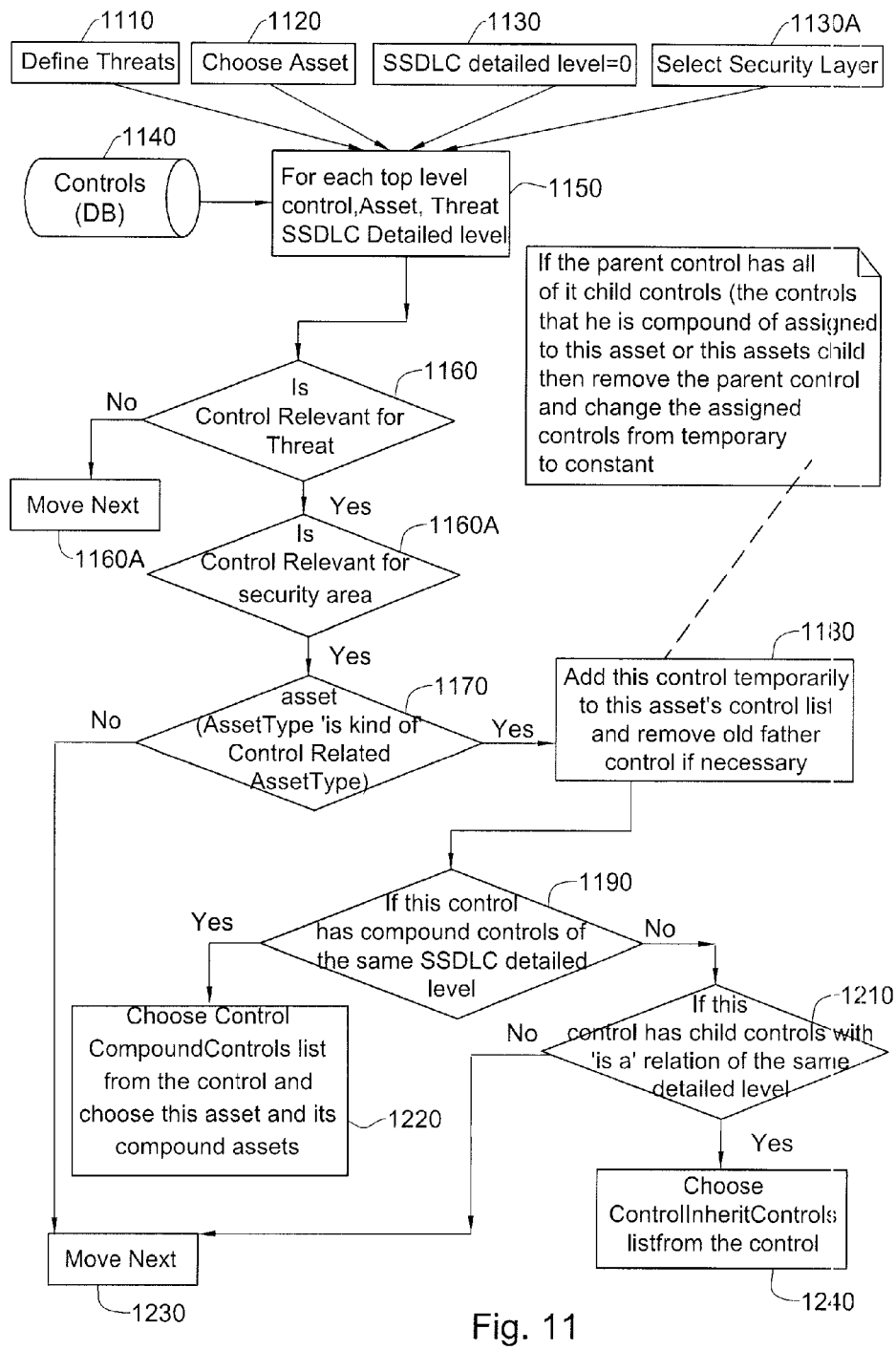
FIG. 11 is a simplified flowchart illustration of a method for performing the selected relevant controls step 1050 of FIG. 10.

This step takes the human inputs of steps 1010-1040 and selects a set of relevant controls according to the selection of steps 1010-1040. Selecting the relevant controls is done according to the method of FIG. 11. FIG. 11 is a simplified flowchart illustration of a method for performing the select relevant controls step 1050 of FIG. 10. The method of FIG. 11, in accordance with certain embodiments of the present invention, includes some or all of the illustrated steps, suitably ordered e.g. as shown. In particular:

Step 1110: user input—selects a set of threats from the possible threats list e.g. as per Control data structure described herein—Data structure diagram of FIGS. 16A-16C)

Step 1120: user input—selects an asset

Step 1130: automatic—set the SSDLC level to '0'—this is the startup phase when begging a new development (e.g: initiating phase/preliminary design etc.)

Step 1130A: choose security areas—selects a set of security areas from the list e.g. as per Control data structure described herein—Data structure diagram of FIGS. 16A-16C)

Step 1140: data structure: the controls database holds the multiple controls structures e.g. as represented by the table of FIGS. 17A-17C with their inner connections (e.g. as per Table of FIG. 20A, Table of FIG. 20B).

Steps 1150-1230 are typically computerized machine steps.

Step 1150: a beginning of a loop that may take every top level control and see if it can be matched to the selections made in steps 1110-1140. The top level controls are the controls as can be seen in the controls in the control DB that have no other control that holds a relation to them (either a compound relation or an 'is-a' relation as can be seen in the control relation data structure described herein). These controls are the top layer of FIG. 19.

Step 1160, 1160A: check if the control has at least one threat and one security area (e.g. as per Data structure diagram of FIGS. 16A-16C) that are in the lists selected in steps 1110 and 1130A.

Step 1170: if the asset's asset type is relevant to the asset types of the selected controls—continue, otherwise go to next controls (by going to step 1230). Checking that an asset is relevant is done by either matching the asset's asset type to the asset types in the control or if the asset type of the asset is a child asset type (below the asset type in the asset type's tree of FIG. 27) of one of the asset type of the controls.

Step 1180: add the current control to a temporary control list of the asset. If this control is compound in a parent control (FIG. 19 and Table of FIG. 20B) and all the compound controls are already part of the temporary control list of the asset, remove the parent control from the list (this means that the parent control was fully replaced by all its compound controls).

Step 1190: if the control checked in step 1180 is of the same development phase as the inputted development phase of step 1130—continue to step 1220, otherwise—to step 1200.

Figure 27:
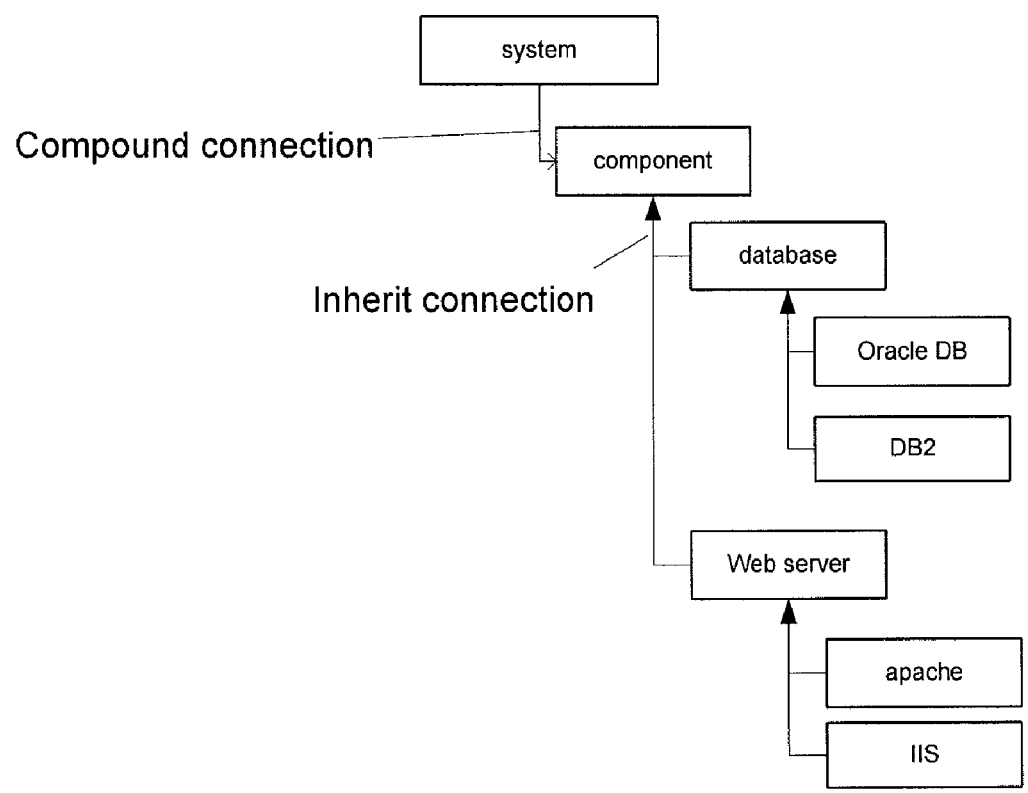
FIG. 27 is a diagram showing a hierarchy of asset types including a structure containing all asset types with at least 2 types of relations between asset types (compound and inherit)

Step 1200: if the control has other controls connected to it with 'is a' relations e.g. as per control relation data structure—FIG. 27) go to step 1210, otherwise—go to step 1230.

Step 1210: for each of the controls this control is connected to in 'is a' relations, go back to step 1160. This step illustrates a 'drill down' in the methods that goes one stage deeper in the controls relation data structure described herein.

Step 1220: for each control in this control's compound controls list e.g. as per Control data structure described herein) go back to step 1160 but here trying not only to match the new controls from the compound list to the asset but also trying to match the new controls to each one of the assets this asset is connected to as child asset e.g. as per Child Asset Collection in FIG. 22)

Step 1230: move the loop to the next control and return to step 1160 with the next control (the loop could be for the asset or for each of the child assets, according to step 1110)

The method ends when all controls were passed and drilled downed in steps 1200-1220 have nowhere further to 'drill down'.

In Step 1060 Requirements are generated from Controls e.g. as per the flowchart of FIG. 11. In this step typically, software transforms each of the selected controls of step 1040 to a requirement by using the information available in the control.

Creating a requirement is based on the fact that a control contains information of how to check and measure a specific security mechanism (e.g. password complexity) while a requirement contains guidance information on how to make sure that the same security mechanism is in place and appropriate.

Figure 12:
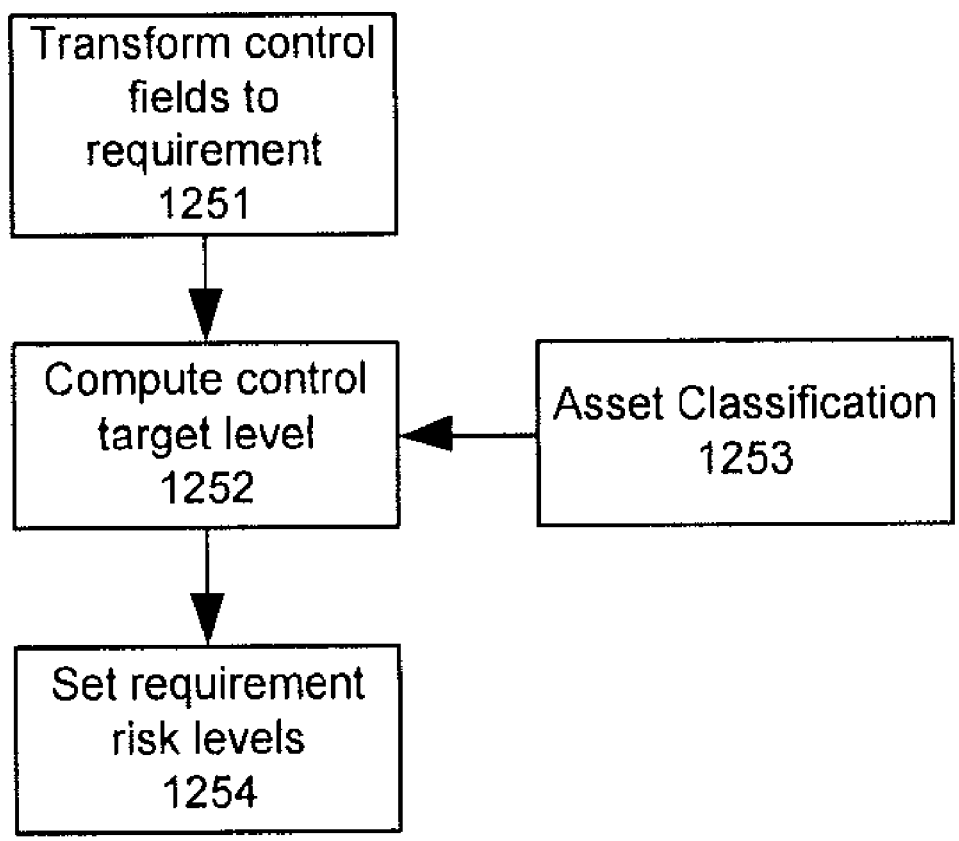
FIG. 12 is a simplified flowchart illustration of a method for performing the step of generating Requirements from Controls e.g. as per step 1060 of FIG. 10.

FIG. 12 is a simplified flowchart illustration of a method for performing the step of generating Requirements from Controls, step 1060 of FIG. 10.

Step 1210: Mapping between the control fields and the requirement fields: (according to Requirement and Control data structure described herein)

Requirement.Asset=Control.Asset

Requirement.RelateThreats=Control.RelatedThreats (the related threats list of data structure diagrams of FIGS. 17A-17C, 18A-18C accordingly)

Requirement.ControlGroup=Control.ControlGroup (the control groups list of data structure diagrams of FIGS. 17A-17C, 18A-18C accordingly)

Requirement.RiskDescription=Control.RiskDescriptionStep 1220: Compute the control's target level takes the Asset's classification from step 1230 and performs the method of FIG. 13; the output of the method may be the Target Answer that indicates the appropriate level for this control for this asset classification level.

In Step 1240 of FIG. 12, Requirement risk level is set. After selecting the target answer the following logic may take place to complete the requirement missing parameters:

Requirement.Risk.Confidentiality=Control.TargetAnswer.Confidentiality−Control.Answer[first answer].Confidentiality     a.

The requirement risk confidentiality level is set as the difference between the selected answer's confidentiality value (the "Confidentiality Weight" column of the relevant row of Table of FIGS. 18A-18C) and the confidentiality value of the first answer associated with that control (according to column "Control ID" of Table of FIGS. 18A-18C)

Requirement.Risk.Integrity=Control.Question.TargetAnswer.Integrity−Control.Question.Answer[first answer].Integrity     b.

Requirement.Risk.Availability=Control.Question.TargetAnswer.
Availability−Control.Question.Answer[first
answer].Availability c.

Requirement.RequirementText=Control.Question.TargetAnswer.
Mitigation. d.

Data manipulations (a)-d) are typically performed by step 1251 of FIG. 12.

Figure 13:
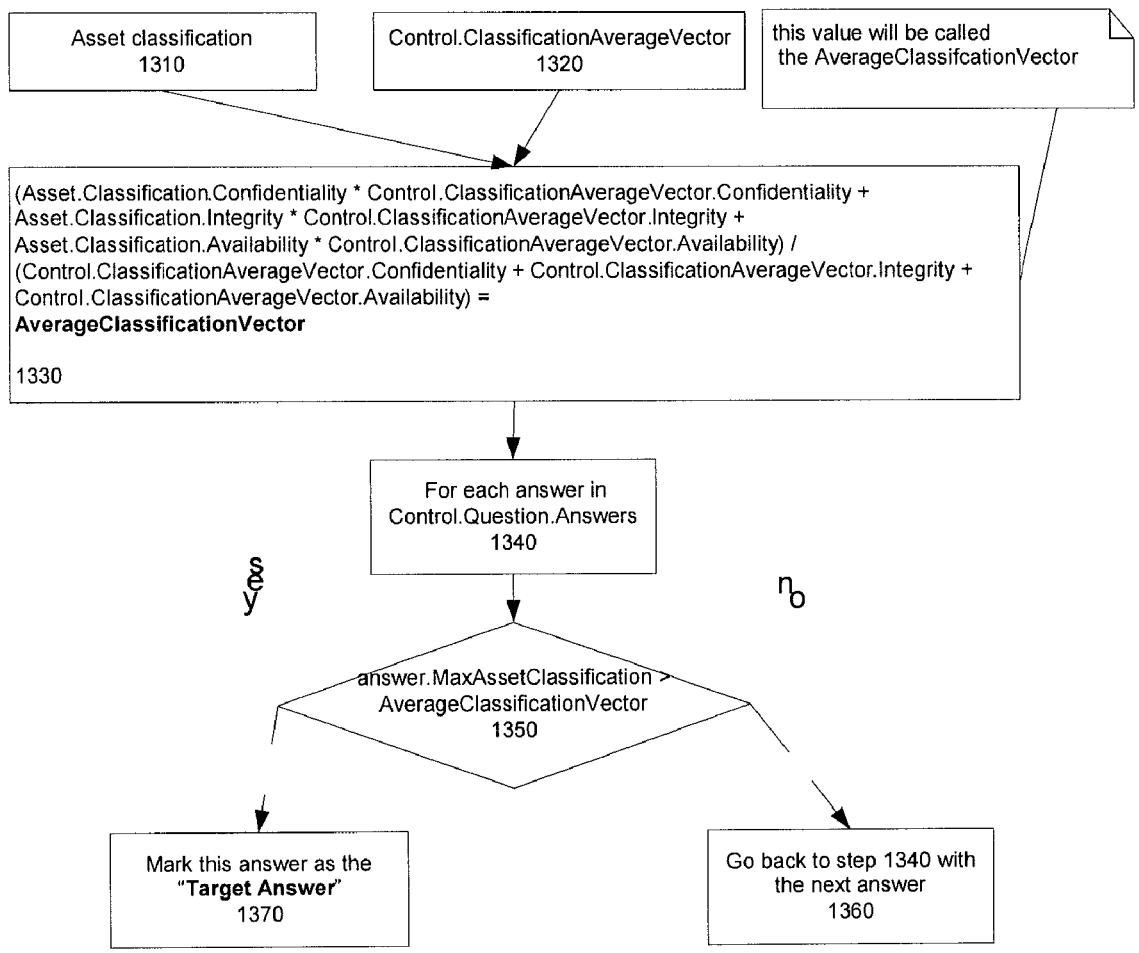
FIG. 13 is a simplified flowchart illustration of a method for performing the control target level computation step of FIG. 12.

FIG. 13 is a simplified flowchart illustration of a method for performing the control target level computation step 1220 of FIG. 12. The method of FIG. 13, in accordance with certain embodiments of the present invention, includes some or all of the illustrated steps, suitably ordered e.g. as shown.

Generally, a control target level may be used to determine a security requirement risk level as follows: after selecting a control target the security requirement risk level may be set as the CIA vector of the answer that has a MaxAssetClassification value in its control, which is greater than or equal to the already-computed requirement risk level minus the CIA vector value of the first (less good) answer for this control. For example, possible answers in a control re how long is an encryption key, may include the following:

0) no encryption—(CIA=0,0,0, MaxAssetClassification=0)
1) 256 bit key—(CIA=1,0,0, MaxAssetClassification=0)
2) 512 bit key—(CIA=3,0,0, MaxAssetClassification=2)
3) 1024 bit key—(CIA=5,0,0, MaxAssetClassification=4)

For a low MaxAssetClassification value, such as 1, answer 2 would be enough because the MaxAssetClassification there is 2 and the risk will be CIA=(1,0,0)−(0,0,0)=(1,0,0). For a high MaxAssetClassification such as 5, answer 3 would be enough because the MaxAssetClassification there is 4 and the risk will be CIA=(4,0,0)−(0,0,0)=(4,0,0).

Referring again to FIG. 7, step 750 typically comprises a manual process in which the user can indicate for each requirement created in step 740 of FIG. 7 if the requirement was implemented and the status of that requirement. If a requirement was implemented then the requirement is updated (manually) to as a fulfilled requirement. The term "manual" is used herein to include inter alia processes in which a human user operates a computerized workstation in accordance with the teachings shown and described herein.

Step 760 in FIG. 7 comprises a progress development phase. In this step the software may automatically generate a complementary set of requirements that may suit the next development phase. For example, if there was a requirement in the preliminary design phase to use encryption when working with sensitive information, this requirement could be replaced by a more concrete requirement to use 1024 bit key and AES encryption method (AES—Advanced Encryption Standard—a known security data encryption method) in the detailed design phase and to a requirement to use a specific implementation of AES in the organization in the implementation phase.

Figure 14:
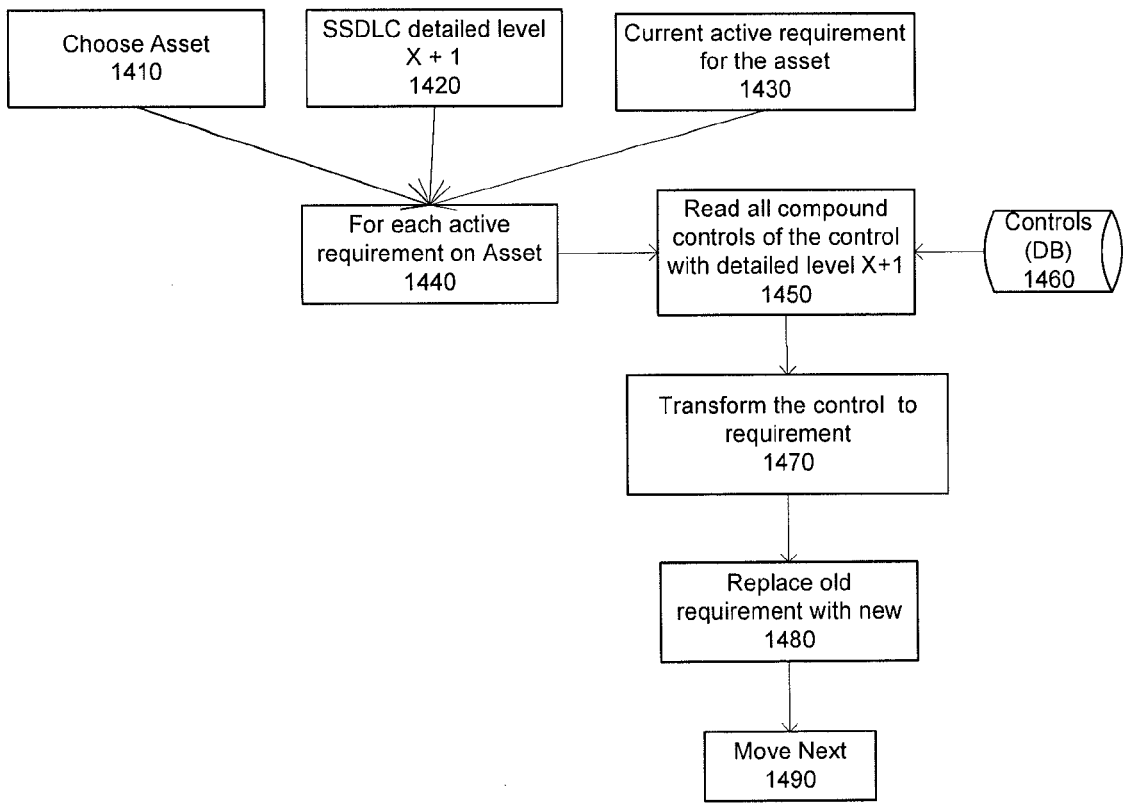
FIG. 14 is a simplified flowchart illustration of a method for performing step 760 (Progress to the next development phase) of FIG. 7.

FIG. 14 is a simplified flowchart illustration of a method for performing step 760 (Progress to the next development phase) of FIG. 7. The method of FIG. 14, in accordance with certain embodiments of the present invention, includes some or all of the illustrated steps, suitably ordered e.g. as shown.

Steps 1410, 1420: Inputs from the user. The SSDLC detailed level X+1 indicates the next phase of a SDLC process, e.g. moving from "High Level Design" development phase to a "Detailed Design".

Step 1430: the current set of requirements that are still active (where not fulfilled in step 750 of the method of FIG. 7).

Step 1440: in this step the system may starts a loop on each of the active requirements from steps 3 on the asset defined in step 1410.

Step 1450: search in the control DB (from step 1460) for the control that this requirement was created from. This control is the one that was transformed to a requirement according to FIG. 12.

For each of the controls that are compounded in those controls, see if there is one or more controls with a development phase e.g. as per control data structure described herein) as the development phase inputted in step 1420. (Compound controls according to Table of FIG. 20A)

Step 1470: the system uses the same logic as described in FIG. 12 to transform each of the controls that are relevant to requirements.

Step 1480: if relevant controls were found in step 1450 and transformed in step 1470, remove the current requirement from the asset's requirement list (Data structure diagram of FIG. 22)—this is due to the fact that the requirement that was previously set for the asset, was changed to a more concrete e.g. more detailed requirement/s.

Step 1490: continue to next requirement from the pool of active requirements in step 1440.

Examples of data structures which are suitable for implementing certain of the methods shown and described herein are now shown. A suitable data structure for a Requirement is exemplified by the requirement xml file illustrated in the Data structure diagram of FIG. 15. A suitable data structure for a Control is exemplified by the control xml file illustrated in the Data structure diagram of FIGS. 16A-16C. A suitable data structure for storing controls is the Control example table of FIGS. 17A-17C. An example of a table for storing answers is the Table of FIGS. 18A-18C, taken together. As part of the data structure described herein above there is typically a definition for the control's relations to other controls in a compound connection or an inherited connection. These connections create hierarchical data as shown in the diagram of FIG. 19.

Figure 19:
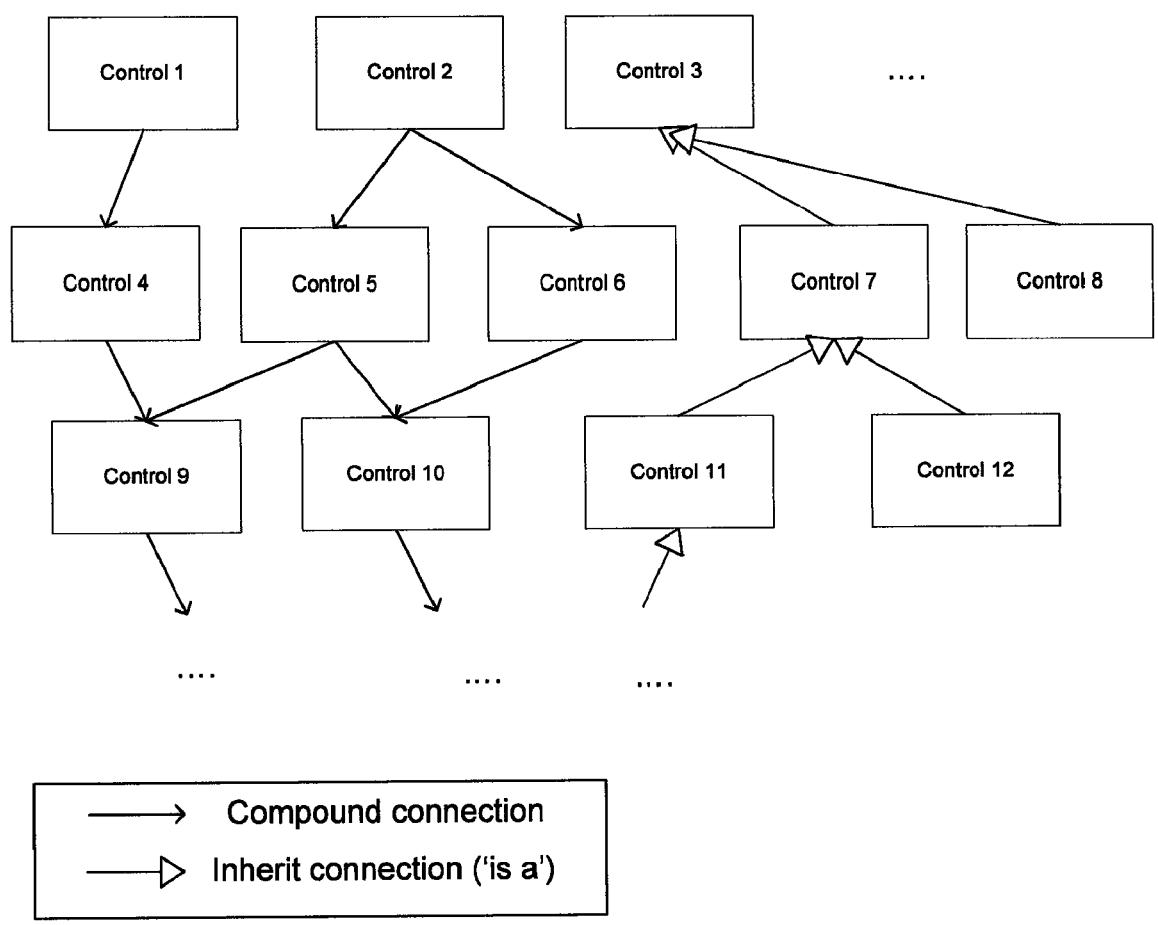
FIG. 19 is a diagram of an example hierarchical relationship between controls, in accordance with certain embodiments of the present invention.

Compound connections, illustrated in FIG. 19, indicate that a control can be replaced by one or more controls (that are the ones connected using this relation type). The replacing controls may be of the same nature as the parent control but may add additional and more granular information. Granularity is the extent to which a security requirement or control is broken down into small parts. So, for example, a control with the question: "Do you have a contingency plan in place" can be replaced with the following, as indicated in italics:

Is the contingency plan valid?
Is there a responsible person for disaster recovery issues?
Are backups performed on a regular basis? . . . .

Inherit connection symbols in FIG. 19 indicate that a control can be replaced by one other control that better fits the asset type of the asset being assessed.

For example, suppose security risk on Microsoft SQL server is being assessed. A generalization of that asset type would be a "Database" and even higher generalization would be a "Server", e.g: a control with question: "are there host hardening procedures for the server?" could be replaced by "are there host hardening procedures for the database" or even "are there host hardening procedures for the SQL server". The table of FIG. 20A is an example of a compound connection table. Control and compound control IDs are according to table of FIGS. 17A-17C. The table of FIG. 20B is an example of an inherit connection table. Control and inherit control IDs are according to the table of FIGS. 17A-17C. The Table of FIG. 21A is an example of an Asset Classification Questionnaire. The Table of FIG. 21B is an example of a populated classification questionnaire. A typical Asset is shown in the Data structure diagram of FIG. 22. An additional table to support mapping of asset to their compound asset is shown in the Table of FIG. 24. An Asset Type's data structure may be as per the following Asset type (XML example), as indicated in italics:

Name
Compound Asset Type list
Inherit Asset Type list.

A compound asset type is an asset type which may contain the asset types in the compound asset type list.

An inherit asset type is an asset type which may be replaced with each of the asset types in the inherit asset types which are more detailed/concrete.

EXAMPLE

The data structure diagram of FIG. 25 is an example of an asset type table. The table of FIG. 26 is an example of an Asset Type hierarchy. The hierarchy of asset types is a structure containing all asset types with the 2 types of relations between asset types (compound and inherit) E.g. as per FIG. 27.

An example of a Compound Asset Type table is illustrated in FIG. 28A. An example of an Inherit Asset Type table is illustrated in FIG. 28B.

An example of a Work Session utilizing the teachings of certain embodiments of the present invention, is now set out in detail.

Assume an organization has an e-banking system on which the organization wishes to manage risk. The purpose of this work session may be to demonstrate the process the organization goes through when using the SSDLC to automatically generate requirements for the system and manage them.

In step 730 of FIG. 7, the asset is classified. The user may fill the asset classification questionnaire for the system: For example, the user fills Table of FIG. 21B with the exemplary data shown in FIG. 29.

Then the classification of the e-banking system may be according to FIGS. 8, 9:

Asset.Confidentiality=(3*3+4+4*2+1+5*5*5+5*5*2)/(3*3+4*2+5*5+5*5)=3.27

Asset.Integrity=(3*3*4+4*5*3+5*2*3+5*5*2)/(3*3+4*5+5*2+5*5)=2.75

Asset.Availability=(3*3*4+4*5*3+5*3*3+5*4*2)/(3*3+4*5+5*3+5*4)=2.82

Selecting relevant controls for the first development stage—High Level Design is performed in step 1050 of FIG. 10. Once this classification is set, the requirements based on the tables of FIGS. 17A-18C and 20A-20B and FIG. 11, can be generated.

User Inputs:
step 1110—the user selects all the available threats
step 1120—the user selects the e-banking asset
step 1130A—the user select all available security layers; these layers are also termed herein "control groups". The asset type of the e-banking is 'System' asset type (from Table of FIG. 26 or FIG. 27)

Using the content in the tables of FIGS. 17A-18C and 20A-20B (that represent step 4 of FIG. 11), start from the controls ID'ed as 7 and 10 in the table of FIGS. 17A-17C. After selecting them as relevant for the first development phase (High Level Design) no further drilling down to their compound controls will be possible (from Table of FIG. 20A), since their compound controls are associated with a different development phase (step 1190 of FIG. 11). The next step is transforming these controls to requirements (FIG. 10, step 1060). This step may yield the requirement entities described hereinbelow, given the structure of a requirement shown in data structure diagram of FIG. 15.

Computing the risk associated with each requirement is now described. For each of the controls the target level of the control may be computed according to FIG. 13:

Control ID 10: AverageClassificationVector of step 3 FIG. 13=(3.27*3+2.75*4+2.82*4)/(3+4+4)=2.917273

So the first answer that suits this value is answer ID 11 in the table of FIGS. 18A-18C where the MaxAssetClassification value is 3.

From here the risk values of this requirement may be:

Confidentiality=Answer[11].Confidentiality−Answer[8].Confidentiality=1

Integrity=Answer[11].Integrity−Answer[8].Integrity=2

Availability=Answer[11].Availability−Answer[8].Availability=2

For control ID 7, AverageClassificationVector of step 1330 in FIG. 13=(3.27*4+2.75*4+2.82*4)/(4+4+4)=2.946. The first answer that suits this value is answer ID 14 in the Table of FIGS. 18A-18C where the MaxAssetClassification value is 5 (and it is the last answer for this control). From here the risk values of this requirement may be:

Confidentiality=Answer[14].Confidentiality−Answer[13].Confidentiality=5

Integrity=Answer[14].Integrity−Answer[13].Integrity=3

Availability=Answer[14].Availability−Answer[13].Availability=3

Creating the requirement out of the selected control (step 1060 of FIG. 10): The requirement for Control ID 10 that may be created for this control is illustrated in FIG. 30A. For control ID 7, the requirement that may be created for this control is illustrated in FIG. 30B.

Fulfill the requirements (step 750 of FIG. 7): After the requirements have been created, the user can indicate that he has finished implementing some of them. Implementing a requirement means that the user has done what was instructed in the RequirementText field.

To continue the working session of the illustrated example, it is assumed the user has finished requirement 10 (the requirement created from Control 10) and has not yet performed the action (RequirementText) demanded in requirement 7 (the requirement created from Control 7). Controls 7 and 10 are set out in FIGS. 17B-17C (ID column for 7th and 10$^{th}$ entries in table).

FIG. 7, step 760 (Progress to the next development phase): Assume that the "High Level Design" is followed by the "Detailed Design" development phase. Now take the controls that were not fulfilled (e.g. their RequirementText was not completed) and use the method of FIG. 14 to replace them with more concrete requirements suited to the new development phase.

Control ID 7 has Control IDs 4 and 1 as compound controls thereof. Control ID 1 may be ignored in step 1470 of FIG. 14 (its development phase is "Implementation"), so only Control ID 4 may be selected.

Using the same transformation process as before for Control ID 7, Control ID 4 may be converted to a requirement.

The embodiments of FIGS. 17A-17C, 20A-20B taken together with the methods in FIGS. 11, 13 and 14 may yield a method operative to automatically create a set of requirements based on the policy (of the Tables of FIGS. 17A-17C, 20A-20B), the asset classification (which is used in FIG. 13) and the development phase. By progressing to the development phase, the system provides an automated way to transform or evolve requirements (also termed herein security requirements) relevant to one development phase to a set of new requirements relevant to another, such as the next, development phase.

"Requirement" as used herein includes any demand or rule limiting operation of a large, complex computerized system. "Control" as used herein includes any measure taken by the system to ensure that one or more requirements are upheld.

The term "organizational policy" as used herein is intended to include any set of guidelines requiring IT personnel to follow specific procedures when performing specific operations such as but not limited to installing servers, developing systems, configuring IT hardware and the like. If the system in question is under development, the organization policy typically includes security requirements that the developer is to follow in order to appropriately serve the organization and to avoid security holes that might lead to security incidents for the organization, e.g. a guideline stipulating a level of encryption which a sub-system should have for the data it stores.

The term "Asset classification" as used herein is an IT security term which stipulates how important an asset is to the organization in 1, 2 and most typically all 3 of the areas of confidentiality, integrity and availability. Confidentiality includes the importancy level of the data that the asset stores (e.g. an internal phone book is less important than a list of clients), Integrity includes the importancy level that the data being shown will not be changed by a malicious source (e.g.—employees' home addresses is less important than employees' salary), and availability includes the importancy that the system will be available at all times (e.g. the internal phonebook availability is not high but an e-banking system that serves clients must be available at all times).

A "policy" might guide the system developers to use a specific type of encryption vis a vis a particular asset depending on the importance of Confidentiality in the asset's classification. According to certain embodiments, if the asset's classification determines that the confidentiality level of the asset is high, a suitable level of encryption for that asset would be automatically selected to comply with the high (say) confidentiality classification as set by the policy.

In phase 1 of development of a new system, a requirement could be 'use strong encryption to store confidential information'. When transforming to phase 2, according to certain embodiments, the above requirement is automatically changed to a more detailed requirement such as: 'use AES encryption algorithm to encrypt confidential information' and/or 'use a 2048 length bit key when encrypting data'.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A security assessment method for assessing security of a computerized system under development and having at least one security requirement, the method comprising:
   computing a control target level for at least one control existing in a computerized system under development; and
   using said control target level to set a risk level for the at least one security requirement wherein said computing the target level includes:
   combining a CIA vector characterizing an individual control for an individual asset with the asset's CIA classification vector, thereby to generate a numerical value; and
   using said numerical value in searching through the controls' different answers to select which answer will satisfy said individual control for said individual asset.

2. A security assessment method according to claim 1, the system including assets and being managed in accordance with an organization policy, the method also including:
   providing an organizational computerized system development policy;
   classifying the assets in the system under development, thereby to generate asset classification information; and
   automated creation of at least one security requirement based on said asset classification information and said organization policy.

3. A method according to claim 1 wherein said policy includes a stipulation of at least one individual required encryption scheme for at least one individual class of assets.

4. A method according to claim 3 wherein said class of assets includes an asset whose importance from a viewpoint of asset confidentiality maintenance falls within a stipulated range.

5. A method according to claim 3 wherein said class of assets includes an asset whose importance from a viewpoint of asset integrity maintenance falls within a stipulated range.

6. A method according to claim 3 wherein said class of assets includes an asset whose importance from a viewpoint of asset availability maintenance falls within a stipulated range.

7. A method according to claim 3 wherein said automated creation includes generating a security requirement for said at least one required encryption scheme vis-a-vis each individual asset which, according to said asset classification information, belongs to said individual class of assets.

8. A method according to claim 1 wherein said policy includes a stipulation of at least one of a server installation process, and an IT hardware configuration process.

9. A method according to claim 1 wherein said asset classification information quantifies the asset's importance from a viewpoint of at least one of asset confidentiality maintenance, asset integrity maintenance and asset availability maintenance.

10. A security assessment method according to claim 1, the method comprising:
   providing at least one initial security requirement definition which applies while said system under development is in a first phase of development: and
   translating said at least one initial security requirement that pertains to said first phase to a more detailed security requirement that pertains to a subsequent phase of development.

11. A method according to claim 10 wherein said first phase comprises a design phase.

12. A method according to claim 10 wherein said subsequent phase comprises an implementation phase.

13. A method according to claim 10 wherein said first and subsequent phases comprise SDLC (Software Development Lifecycle) phases.

14. A method according to claim 10 wherein said initial security requirement stipulates a desired strength of encryption and said more detailed security requirement stipulates technology to implement said desired strength of encryption.

15. A computer program product, comprising a computer usable medium having a computer readable program code embodied therein, said computer readable program code adapted to be executed to implement a security assessment method according to claim 1 for assessing security of a computerized system under development, the system including assets and being managed in accordance with an organization policy, the method also including:
   providing an organizational computerized system development policy;
   classifying said assets in said system under development, thereby to generate asset classification information; and
   automated creation of at least one security requirement based on said asset classification information and said organization policy.

16. A computer program product, comprising a computer usable medium having a computer readable program code embodied therein, said computer readable program code adapted to be executed to implement a security assessment method according to claim 1 for assessing security of a computerized system under development and having at least one security requirement.

17. A computer program product, comprising a computer usable medium having a computer readable program code embodied therein, said computer readable program code adapted to be executed to implement a security assessment method according to claim 1 for assessing security of a computerized system under development, the method also comprising:
   providing at least one initial security requirement definition which applies while said system under development is in a first phase of development: and
   translating said at least one initial security requirement that pertains to said first phase to a more detailed security requirement that pertains to a subsequent phase of development.

18. A security assessment device for assessing security of a computerized system under development and having at least one security requirement, the device comprising:
   a control target level computer operative for Computing a control target level for at least one control existing in a computerized system under development; and
   a security requirement risk level generator using said control target level to set a risk level for the at least one security requirement;
   wherein said computing the target level by said control target level computer includes:

combining a CIA vector characterizing an individual control for an individual asset with the asset's CIA classification vector, thereby to generate a numerical value; and
using said numerical value in searching through the controls' different answers to select which answer will satisfy said individual control for said individual asset.

19. A security assessment device according to claim 18, the system including assets and being managed in accordance with an organization policy, the device also including:
asset classification apparatus classifying said assets in said system under development, thereby to generate asset classification information; and
a requirement generator for automated creation of at least one security requirement based on said asset classification information and an organizational computerized system development policy.

20. A security assessment device according to claim 18, the device also comprising:
a requirement database including at least one initial security requirement definition which applies while said system under development is in a first phase of development: and
a requirement translator operative for translating said at least one initial security requirement that pertains to said first phase to a more detailed security requirement that pertains to a subsequent phase of development.

21. A security assessment method for assessing security of a computerized system under development and having at least one security requirement, the method comprising:
computing a control target level for at least one control existing in a computerized system under development; and
using said control target level to set a risk level for the at least one security requirement,
wherein said using includes selecting a control target, setting the security requirement risk level as the CIA vector of the answer whose control's MaxAssetClassification value is greater than or equal to the difference between the already-computed requirement risk level and the CIA vector value of the first (less good) answer for said control.

22. A security assessment method according to claim 21, the method comprising:
providing at least one initial security requirement definition which applies while said system under development is in a first phase of development: and
translating said at least one initial security requirement that pertains to said first phase to a more detailed security requirement that pertains to a subsequent phase of development.

23. A method according to claim 22 wherein said first phase comprises a design phase.

24. A method according to claim 22 wherein said subsequent phase comprises an implementation phase.

25. A method according to claim 22 wherein said first and subsequent phases comprise SDLC (Software Development Lifecycle) phases.

26. A method according to claim 22 wherein said initial security requirement stipulates a desired strength of encryption and said more detailed security requirement stipulates technology to implement said desired strength of encryption.

27. A computer program product, comprising a computer usable medium having a computer readable program code embodied therein, said computer readable program code adapted to be executed to implement a security assessment method according to claim 21 for assessing security of a computerized system under development, the system including assets and being managed in accordance with an organization policy, the method also including:
providing an organizational computerized system development policy;
classifying said assets in said system under development, thereby to generate asset classification information; and
automated creation of at least one security requirement based on said asset classification information and said organization policy.

28. A computer program product, comprising a computer usable medium having a computer readable program code embodied therein, said computer readable program code adapted to be executed to implement a security assessment method according to claim 21 for assessing security of a computerized system under development and having at least one security requirement.

29. A security assessment method according to claim 21:
the system including assets and being managed in accordance with an organization policy,
the method also including:
providing an organizational computerized system development policy;
classifying the assets in the system under development, thereby to generate asset classification information;
automated creation of at least one security requirement based on said asset classification information and said organization policy.

30. A method according to claim 29 wherein said policy includes a stipulation of at least one individual required encryption scheme for at least one individual class of assets.

31. A method according to claim 30 wherein said class of assets includes an asset whose importance from a viewpoint of asset confidentiality maintenance falls within a stipulated range.

32. A method according to claim 30 wherein said class of assets includes an asset whose importance from a viewpoint of asset integrity maintenance falls within a stipulated range.

33. A method according to claim 30 wherein said class of assets includes an asset whose importance from a viewpoint of asset availability maintenance falls within a stipulated range.

34. A method according to claim 30 wherein said automated creation includes generating a security requirement for said at least one required encryption scheme vis-a-vis each individual asset which, according to said asset classification information, belongs to said individual class of assets.

35. A method according to claim 29 wherein said policy includes a stipulation of at least one of a server installation process, and an IT hardware configuration process.

36. A method according to claim 29 wherein said asset classification information quantifies the asset's importance from a viewpoint of at least one of asset confidentiality maintenance, asset integrity maintenance and asset availability maintenance.

37. A security assessment device for assessing security of a computerized system under development and having at least one security requirement, the device comprising:
a control target level computer operative for computing a control target level for at least one control existing in a computerized system under development; and
a security requirement risk level generator using said control target level to set a risk level for the at least one security requirement;
wherein said using by said security requirement risk level generator includes selecting a control target, setting the security requirement risk level as the CIA vector of the answer whose control's MaxAssetClassification value is greater than or equal to the difference between the already-computed requirement risk level and the CIA vector value of the first (less good) answer for said control.

38. A security assessment device according to claim 37, the device also comprising:
   a requirement database including at least one initial security requirement definition which applies while said system under development is in a first phase of development: and
   a requirement translator operative for translating said at least one initial security requirement that pertains to said first phase to a more detailed security requirement that pertains to a subsequent phase of development.

39. A security assessment device according to claim 37, the system including assets and being managed in accordance with an organization policy, the device also including:
   asset classification apparatus classifying said assets in said system under development, thereby to generate asset classification information; and
   a requirement generator for automated creation of at least one security requirement based on said asset classification information and an organizational computerized system development policy.

* * * * *